US010306478B2

(12) United States Patent
Futaki

(10) Patent No.: US 10,306,478 B2
(45) Date of Patent: May 28, 2019

(54) RADIO TERMINAL, RADIO STATION, AND METHOD THEREOF

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/523,889

(22) PCT Filed: Oct. 9, 2015

(86) PCT No.: PCT/JP2015/005137
§ 371 (c)(1),
(2) Date: May 2, 2017

(87) PCT Pub. No.: WO2016/072047
PCT Pub. Date: May 12, 2016

(65) Prior Publication Data
US 2017/0318473 A1    Nov. 2, 2017

(30) Foreign Application Priority Data

Nov. 6, 2014  (JP) ................................. 2014-226392

(51) Int. Cl.
*H04W 72/00*    (2009.01)
*H04W 16/14*    (2009.01)
(Continued)

(52) U.S. Cl.
CPC ........... *H04W 16/14* (2013.01); *H04W 48/16* (2013.01); *H04W 56/00* (2013.01); *H04W 56/001* (2013.01); *H04W 72/04* (2013.01)

(58) Field of Classification Search
CPC ... H04W 16/14; H04W 56/001; H04W 48/16; H04W 56/00; H04W 72/04
(Continued)

(56) References Cited

U.S. PATENT DOCUMENTS 8,184,573 B2 *  5/2012  Higuchi ............... H04J 11/0076
                                              370/324
8,238,318 B1 *  8/2012  Negus .................. H04W 84/12
                                              370/310
(Continued)

FOREIGN PATENT DOCUMENTS

EP        2 152 016 A1    2/2010
JP        2009-027676 A   2/2009

OTHER PUBLICATIONS

International Search Report corresponding to PCT/JP2015/005137, dated Nov. 24, 2015 (5 pages).
(Continued)

*Primary Examiner* — Marceau Milord
(74) *Attorney, Agent, or Firm* — Wilmer Cutler Pickering Hale and Dorr LLP

(57) ABSTRACT

A radio terminal (3) operates to perform a predetermined process regarding a first cell (Cell #2) on an unlicensed frequency (F2) based on a predetermined relationship between a frame timing of a first serving cell (Cell #1) using a licensed frequency (F1) and a frame timing of the first cell (Cell #2) using the unlicensed frequency (F2). This contributes, for example, to enabling a radio terminal to differentiate among two or more cells when these cells use the same cell identifier.

4 Claims, 19 Drawing Sheets

(51) Int. Cl.
*H04W 48/16* (2009.01)
*H04W 56/00* (2009.01)
*H04W 72/04* (2009.01)

(58) Field of Classification Search
USPC ......... 455/454, 450, 509, 552.1, 436, 435.1, 455/435.2, 452.1, 446, 447
See application file for complete search history.

(56) References Cited

U.S. PATENT DOCUMENTS

| | | | | |
|---|---|---|---|---|
| 8,290,503 | B2* | 10/2012 | Sadek | H04W 72/082 455/450 |
| 8,311,023 | B1* | 11/2012 | Negus | H04W 84/12 370/310 |
| 8,521,087 | B2* | 8/2013 | Kim | H04W 24/10 370/329 |
| 8,737,308 | B2* | 5/2014 | Gaal | H04W 72/082 370/252 |
| 8,750,156 | B1* | 6/2014 | Carbajal | H04W 24/08 370/252 |
| 8,761,677 | B2* | 6/2014 | Kim | H04L 27/0006 375/240.21 |
| 8,780,968 | B1* | 7/2014 | Garcia | H04W 24/08 375/228 |
| 8,805,292 | B1* | 8/2014 | Carbajal | H04W 24/08 455/67.11 |
| 8,811,365 | B2* | 8/2014 | Negus | H04W 84/12 370/310 |
| 9,042,248 | B2 | 5/2015 | Futaki | |
| 9,184,889 | B2* | 11/2015 | Kim | H04L 5/0048 |
| 9,191,987 | B2* | 11/2015 | Nentwig | H04W 76/066 |
| 9,219,588 | B2* | 12/2015 | Yamamoto | H04L 5/0053 |
| 9,350,519 | B2* | 5/2016 | Ma | H04L 5/0066 |
| 9,402,256 | B2* | 7/2016 | Kim | H04W 72/0453 |
| 9,419,760 | B2* | 8/2016 | Nagata | H04J 1/00 |
| 9,420,482 | B2 | 8/2016 | Futaki et al. | |
| 9,510,208 | B2* | 11/2016 | Wei | H04W 16/14 |
| 9,609,520 | B2* | 3/2017 | Shellhammer | H04W 16/14 |
| 9,622,041 | B2* | 4/2017 | Garcia | H04W 4/028 |
| 9,717,087 | B2* | 7/2017 | Zhang | H04W 72/0406 |
| 9,775,087 | B2* | 9/2017 | Chou | H04W 36/22 |
| 9,801,117 | B2* | 10/2017 | Gaal | H04W 48/12 |
| 9,814,029 | B2 | 11/2017 | Futaki et al. | |
| 9,832,655 | B2* | 11/2017 | Horneman | H04W 16/14 |
| 9,872,233 | B2* | 1/2018 | Jeon | H04W 48/16 |
| 9,929,839 | B2* | 3/2018 | Liu | H04L 5/0048 |
| 9,967,802 | B2* | 5/2018 | Malladi | H04L 5/0007 |
| 10,237,771 | B2 | 3/2019 | Futaki et al. | |
| 10,237,772 | B2 | 3/2019 | Futaki et al. | |
| 2010/0135257 | A1* | 6/2010 | Higuchi | H04J 11/0076 370/336 |
| 2013/0022026 | A1* | 1/2013 | Ishii | H04L 5/001 370/332 |
| 2013/0203458 | A1* | 8/2013 | Charbit | H04W 52/34 455/522 |
| 2014/0044105 | A1 | 2/2014 | Bontu et al. | |
| 2014/0341207 | A1* | 11/2014 | Bhushan | H04W 28/0289 370/350 |
| 2014/0378157 | A1* | 12/2014 | Wei | H04W 16/14 455/454 |
| 2015/0098349 | A1 | 4/2015 | Wei et al. | |
| 2015/0189574 | A1* | 7/2015 | Ng | H04W 24/08 370/252 |
| 2015/0195849 | A1* | 7/2015 | Bashar | H04W 16/14 370/330 |
| 2015/0223075 | A1* | 8/2015 | Bashar | H04W 16/14 370/329 |
| 2015/0271847 | A1* | 9/2015 | Luo | H04W 74/002 370/329 |
| 2015/0289208 | A1* | 10/2015 | Liu | H04L 1/1887 370/252 |
| 2015/0319701 | A1* | 11/2015 | Ng | H04L 5/005 370/311 |
| 2016/0066322 | A1 | 3/2016 | Bontu et al. | |
| 2016/0095110 | A1* | 3/2016 | Li | H04W 72/1215 370/329 |
| 2016/0234706 | A1* | 8/2016 | Liu | H04L 5/0048 |
| 2017/0208588 | A1* | 7/2017 | Park | H04L 7/00 |
| 2017/0251442 | A1* | 8/2017 | Kalhan | H04W 56/001 |

OTHER PUBLICATIONS

3GPP TS 36.300 V12.2.0 (Jun. 2014), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Jun. 2014, (215 pages).

3GPP RP-131635, "Introducing LTE in Unlicensed Spectrum," Qualcomm, Ericsson, Dec. 2013, (8 pages).

3GPP Workshop on LTE in Unlicensed Spectrum, RWS-140002, Sophia Antipolis, France, "LTE in Unlicensed Spectrum: European Regulation and Coexistence Considerations," Nokia, Jun. 13, 2014, pp. 1-13.

3GPP TS 36.331 V12.2.0 (Jun. 2014), "3rd Generation Partnership Project; Technical Specification Group Radio Access Network; Evolved Universal Terrestrial Radio Access (E-UTRA); Radio Resource Control (RRC); Protocol specification (Release 12)," Jun. 2014, (365 pages).

3GPP TR 36.842 V12.0.0 (Dec. 2013), "3rd Generation Partnership Project; Technical Specification Group Radio Access Network; Study on Small Cell enhancements for E-UTRA and E-UTRAN; Higher layer aspects (Release 12)," Dec. 2013, (71 pages).

3GPP TSG RAN WG1 Meeting #78bis, Slovenia, Kyocera, "Design overview on LAA," Oct. 6-10, 2014, (6 pages).

3GPP TSG RAN 2 Meeting #89, R2-150394, Greece, NEC, Timing relationships across serving cells in LAA, Feb. 9-13, 2015, (3 pages).

3GPP TSG RAN2 Meeting #89bis, R2-151413, Slovakia, NEC, "Timing relationships across cells," Apr. 20-24, 2015, (2 pages).

3GPP TSG RAN WG1 Meeting #79, R1-144955, San Francisco, USA, Kyocera, "Further considerations on the essential functionalities for LAA," Nov. 17-21, 2014, (10 pages).

Extended European Search Report issued by the European Patent Office for European Application No. 15857802.1 dated Jul. 9, 2018 (10 pages).

U.S. Patent Office Non-Final Office Action issued in U.S. Appl. No. 16/286,938, dated Apr. 4, 2019, 18 pages.

* cited by examiner

RADIO TERMINAL, RADIO STATION, AND METHOD THEREOF

CROSS-REFERENCE TO RELATED APPLICATIONS

This application is a national stage application of International Application No. PCT/JP2015/005137 entitled "RADIO TERMINAL, RADIO STATION, AND METHOD THEREOF," filed on Oct. 9, 2015, which claims the benefit of the priority of Japanese Patent Application No. 2014-226392, filed on Nov. 6, 2014, the disclosures of each of which are hereby incorporated by reference in their entirety.

TECHNICAL FIELD

The present application relates to a radio communication system, and more particularly to an operation of a radio terminal when there is a cell identifier conflict.

BACKGROUND ART

Hereinafter, Radio frame structures used in 3rd Generation Partnership Project (3GPP) Release 8 (referred to as Long Term Evolution (LTE)) and subsequent releases will be described, and then carrier aggregation (CA) introduced in 3GPP Release 10 (which is referred to as LTE-Advanced) will be described. Further, Licensed Assisted Access (LAA) and Licensed Shared Access (LSA), which are currently being discussed in regard to 3GPP Release 13, will be described.

Firstly, LTE radio frame structures will be described. In 3GPP Release 8 and subsequent releases, two types of the radio frame structures are specified. One is referred to as a frame structure type 1, which is applied to frequency division duplex (FDD). The other one is referred to as a frame structure type 2, which is applied to Time division duplex (TDD). As shown in FIG. 16, in both frame structure type 1 and frame structure type 2, the length of one radio frame is 10 milliseconds and one radio frame consists of 10 subframes. In the case of TDD, the first five subframes (#0 to #4) and the last five subframes (#5 to #9) are each referred to as a half-frame. The length of one half-frame is 5 milliseconds. The length of one subframe is 1 millisecond. One subframe is divided into two slots of 0.5 milliseconds each. In the case of Normal cyclic prefix, one slot includes seven symbols (i.e., single carrier frequency division multiple access (SC-FDMA) symbols in uplink, and orthogonal frequency division multiplexing (OFDM) symbols in downlink) in the time domain. Accordingly, one subframe includes 14 symbols in the time domain.

Moreover, 3GPP Release 10 has specified the Carrier Aggregation (CA) function that enables a radio terminal (User Equipment: UE) to communicate with a radio base station (eNode B: eNB) and using a plurality of cells. Cells available to a UE in CA are limited to a plurality of cells of a single eNB (i.e., cells operated or managed by an eNB). The cells used by the UE in CA are categorized into a primary cell (PCell) that has already been used as a serving cell when CA is started and secondary cell(s) (SCell(s)) that is used additionally or in a dependent manner. In the PCell, when a radio connection is (re-)established (Radio Resource Control (RRC) Connection Establishment, RRC Connection Re-establishment), Non Access Stratum (NAS) mobility information and security information (security input) are transmitted (see Section 7.5 of Non Patent Literature 1).

From a functional point of view, the introduction of CA has enabled high-speed communication. In practical usage, however, it is considered that it would be difficult to address the issue of a further increase in mobile traffic in the future due to limitations (shortage) of frequencies allocated to each operator. Accordingly, in the 3GPP standardization process, discussions on Unlicensed LTE that executes LTE with the use of an unlicensed frequency (unlicensed frequency band, unlicensed spectrum) have been started (Non-Patent Literature 2 and 3). Unlicensed LTE is also referred to as LTE-U or U-LTE and is hereinafter referred to as LTE-U.

As methods for achieving LTE-U, two methods, i.e., Licensed Assisted Access (LAA) in which the eNB performs communication with the UE on the unlicensed frequency in association with the licensed frequency (e.g., as SCell of CA) and Standalone (SA) in which the eNB performs communication with the UE only on the unlicensed frequency, are considered. The unlicensed frequency is, for example, 5 GHz band, which is also used by other systems such as radar systems and wireless LAN (WLAN or also referred to as WiFi). Therefore, with regard to the SA scheme in which communication is performed only on the unlicensed frequency, it would be difficult to implement sophisticated controls specified for LTE and thus the more feasible LAA scheme (also referred to as LA-LTE) has mainly been discussed. In the following description, LTE-U by the LAA scheme, in which CA using the licensed frequency and the unlicensed frequency is performed, will be mainly explained. The licensed frequency means a dedicated frequency allocated to a specific operator. The unlicensed frequency means a frequency that is not allocated to a specific operator or a shared frequency allocated to a plurality of operators. In the latter case, this frequency may be referred to as a licensed shared frequency, not an unlicensed frequency, and communication using this frequency is also referred to as a Licensed Shared Access (LSA). In the following description, frequencies other than licensed frequencies licensed only to any specific operators are collectively referred to as an unlicensed frequency.

LTE-U by the LAA scheme is executed basically in accordance with the sequence shown in FIG. 17. In this example, it is assumed that an eNB performs data transmission (or reception) with a UE #1 in a Cell #1 on a licensed frequency and in a Cell #2 on an unlicensed frequency. Firstly, a radio connection is established between the eNB and UE #1 in the Cell #1 (RRC Connection Establishment, 1501), and a bearer is established between a core network (Evolved Packet Core: EPC) and the UE #1 (not shown). That is, the Cell #1 is a PCell for the UE #1. When there is downlink (DL) user data (also referred to as User Plane (UP) data) to be transmitted to the UE #1 or there is uplink (UL) user data that the UE #1 wants to transmit, the eNB transmits or receives this user data in the Cell #1 (DL (or UL) UP data transmission, 1502).

Next, when the eNB determines that it is efficient for the UE #1 to transmit and receive the user data in the Cell #2 at some point (Trigger LTE-U for UE #1, 1503), the eNB transmits to the UE #1, in the Cell #1, control information about radio resource configuration for the Cell #2 (Radio Resource Configuration for Cell #2, 1504). This control information corresponds to a RadioResourceConfigDedicated Information Element (IE) and a RadioResourceConfigCommon IE transmitted in an RRC Connection Reconfiguration message of LTE (Non Patent Literature 4). The Cell #2 hereby becomes an SCell for the UE #1. When the user data is transmitted in the downlink, the eNB performs sensing in the Cell #2 to determine whether the Cell #2 is available (Perform channel sensing, 1505). Upon determining that the Cell #2 is available, the eNB transmits or receives the user data to or from the UE #1 (DL (or UL) UP data transmission, 1506). As described above, through the use of the unlicensed frequency, it is expected that the throughput will be further improved or the cell capacity will be increased.

The aforementioned sensing is referred to as Listen Before Talk (LBT) (Non-Patent Literature 2), which determines whether LTE-U by another operator or communication of another radio system (e.g., WLAN) is performed nearby on the target unlicensed frequency. The aforementioned sensing corresponds to, for example, Channel Availability Check (CAC) for radar systems and Clear Channel Assessment (CCA) executed by a WLAN Access Point (AP) (Patent Literature 1).

CITATION LIST

Non Patent Literature

Non Patent Literature 1: 3GPP TS 36.300 V12.2.0 (2014-06), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", June 2014

Non Patent Literature 2: 3GPP RP-131635, "Introducing LTE in Unlicensed Spectrum", Qualcomm, Ericsson, December 2013

Non Patent Literature 3: 3GPP workshop on LTE in unlicensed spectrum, RWS-140002, "LTE in Unlicensed Spectrum: European Regulation and Co-existence Considerations", Nokia, June 2014

Non Patent Literature 4: 3GPP TS 36.331 V12.2.0 (2014-06), "3rd Generation Partnership Project; Technical Specification Group Radio Access Network; Evolved Universal Terrestrial Radio Access (E-UTRA); Radio Resource Control (RRC); Protocol specification (Release 12)", June 2014

Non Patent Literature 5: 3GPP TR 36.842 V12.0.0 (2013-12), "3rd Generation Partnership Project; Technical Specification Group Radio Access Network; Study on Small Cell enhancements for E-UTRA and E-UTRAN; Higher layer aspects (Release 12)", December 2013

SUMMARY OF INVENTION

Technical Problem

In LAA, a Primary Synchronization Signal (PSS) and a Secondary Synchronization Signal (SSS) need to be transmitted even in a cell on an unlicensed frequency. By detecting PSS and SSS transmitted in the cell on the unlicensed frequency, a UE can synchronize with the cell on the unlicensed frequency (i.e., UE can detect a position of a 10-milisecond radio frame boundary) and can detect a Physical Cell Identity (PCI) of the cell on the unlicensed frequency.

However, in LAA, a PCI conflict may occur due to two cells on the unlicensed frequency operated by different operators using the same PCI. The PCI conflict includes a PCI collision and a PCI confusion. The PCI collision means that there are two contiguous cells (e.g., cells adjacent to each other) using the same PCI, and the PCI confusion means that there are two cells having the same PCI around a certain cell (e.g., the certain cell has cells adjacent to each other).

For example, as shown in FIG. 18, a UE 93 may detect, by mistake, a cell (Cell #3) of another operator (operator B) that has the same PCI (PCI #5) as a cell provided by an eNB 91 of an operator (operator A) to which the UE 93 belongs, perform terminal measurement on the Cell #3 of the operator B (i.e., measurement of Reference Signal Received Power (RSRP) and Reference Signal Received Quality (RSRQ)), and report, by mistake, a measurement result of the Cell #3 to the eNB 91 in the serving cell (Cell #1) as a terminal measurement result of the Cell #2. Then the eNB 91 may configure the UE 93 to use the Cell #2 in order to initiate CA based on the terminal measurement result. Due to this, the UE 93 may not be able to achieve sufficient communication quality in the Cell #2.

Note that even when a PCI conflict occurs between cells, an UE may be able to differentiate (or distinguish or discriminate) these cells by detecting their Evolved Universal Terrestrial Radio Access Network (E-UTRAN) Cell Global IDs (ECGIs). The ECGI is an identifier for globally uniquely identifying an E-UTRAN cell. However, in a cell on an unlicensed frequency used as a secondary cell for carrier aggregation in LAA, System Information Block type 1 (SIB1) containing ECGI may not be transmitted. Accordingly, if a cell on an unlicensed frequency (or licensed shared frequency) is used as a secondary cell (SCell) for carrier aggregation in LAA (or LSA), it may be difficult for an UE to differentiate this cell from other cells based on their ECGIs.

Note that a PCI conflict could occur in various situations other than in the above-described situations where a plurality of LTE operators uses an unlicensed frequency (or licensed shared frequency) for LAA (or LSA). The PCI conflict, i.e., PCI collision or PCI confusion, could occur when any of an unlicensed frequency, a licensed shared frequency, and a licensed frequency is used, and could occur between operators or within one operator. Further, the PCI confusion could occur when cells use different frequencies but use the same PCI. Furthermore, PCI is an example of a cell identifier (physical identifier). In radio communication systems other than LTE, cell identifiers other than PCI are used (e.g., Primary Scrambling Code (PSC) used in 3GPP Universal Mobile Telecommunications System (UMTS)). Like the PCI conflict, conflicts in these other cell identifiers could occur.

Thus, an object to be attained by embodiments disclosed herein is to provide an apparatus, a method, and a program that contribute to enabling a radio terminal to differentiate among two or more cells even when these cells uses the same cell identifier (e.g., PCI). Note that this object is only one of the objects to be attained by embodiments disclosed herein. The other objects or problems and novel features will be made apparent from the following description and the accompanying drawings.

Solution to Problem

In a first aspect, a radio terminal includes a memory and at least one processor coupled to the memory. The at least one processor is configured to perform a predetermined process regarding a first cell on an unlicensed frequency based on a predetermined relationship between a frame timing of a first serving cell using a licensed frequency and a frame timing of the first cell using the unlicensed frequency.

In a second aspect, a radio station includes a memory and at least one processor coupled to the memory. The at least one processor is configured to: transmit, to a radio terminal, configuration information containing information regarding an offset between a frame timing of a first cell operated by the radio station on a licensed frequency and a frame timing of a second cell operated by the radio station on an unlicensed frequency; and transmit, to the radio terminal, control information regarding a predetermined process performed by the radio terminal on the unlicensed frequency.

In a third aspect, a method performed by a radio terminal includes performing a predetermined process regarding a first cell on an unlicensed frequency based on a predetermined relationship between a frame timing of a first serving cell using a licensed frequency and a frame timing of the first cell using the unlicensed frequency.

In a fourth aspect, a method performed by a radio station includes: transmitting, to a radio terminal, configuration information containing information regarding an offset between a frame timing of a first cell operated by the radio station on a licensed frequency and a frame timing of a second cell operated by the radio station on an unlicensed frequency; and transmitting, to the radio terminal, control information regarding a predetermined process performed by the radio terminal on the unlicensed frequency.

In a fifth aspect, a program includes a set of instructions (software codes) that, when loaded into a computer, causes the computer to perform the method according to the above-described third aspect.

In a sixth aspect, a program includes a set of instructions (software codes) that, when loaded into a computer, causes the computer to perform the method according to the above-described fourth aspect.

Advantageous Effects of Invention

According to the above-described aspects, it is possible to provide an apparatus, a method, and a program that contribute to enabling a radio terminal to differentiate among two or more cells even when these cells use the same cell identifier (e.g., PCI).

DESCRIPTION OF EMBODIMENTS

Specific embodiments will be described hereinafter in detail with reference to the drawings. The same or corresponding elements are denoted by the same symbols throughout the drawings, and repetitive explanations will be omitted as necessary for the sake of clarity.

Embodiments described below will be explained mainly using specific examples with regard to an Evolved Packet System (EPS) that contains LTE and System Architecture Evolution (SAE). However, these embodiments are not limited to being applied to the EPS and may also be applied to other mobile communication networks or systems such as a 3GPP UMTS, a 3GPP2 CDMA2000 system (1×RTT, HRPD (High Rate Packet Data)), a global system for mobile communications (GSM (registered trademark))/General packet radio service (GPRS) system, and a WiMAX system.

First Embodiment

Firstly, some examples of Unlicensed LTE using an unlicensed frequency (Unlicensed frequency band, Unlicensed spectrum) according to a plurality of embodiments including this embodiment will be described. The Unlicensed LTE is also referred to as LTE-U or U-LTE and is hereinafter referred to as LTE-U. The unlicensed frequency includes a frequency that is used for, for example, radar systems and wireless LAN (WLAN or also referred to as WiFi) and includes frequencies other than licensed frequencies allocated only to any specific operators (i.e., service providers). The unlicensed frequency is, for example, but not limited to, 5 GHz band. Further, the plurality of embodiments described below can also be applied to a shared frequency (Shared frequency band, Shared spectrum) commonly allocated to a plurality of operators. In the following description, frequencies other than licensed frequencies are collectively referred to as the unlicensed frequency.

Figure 1A:
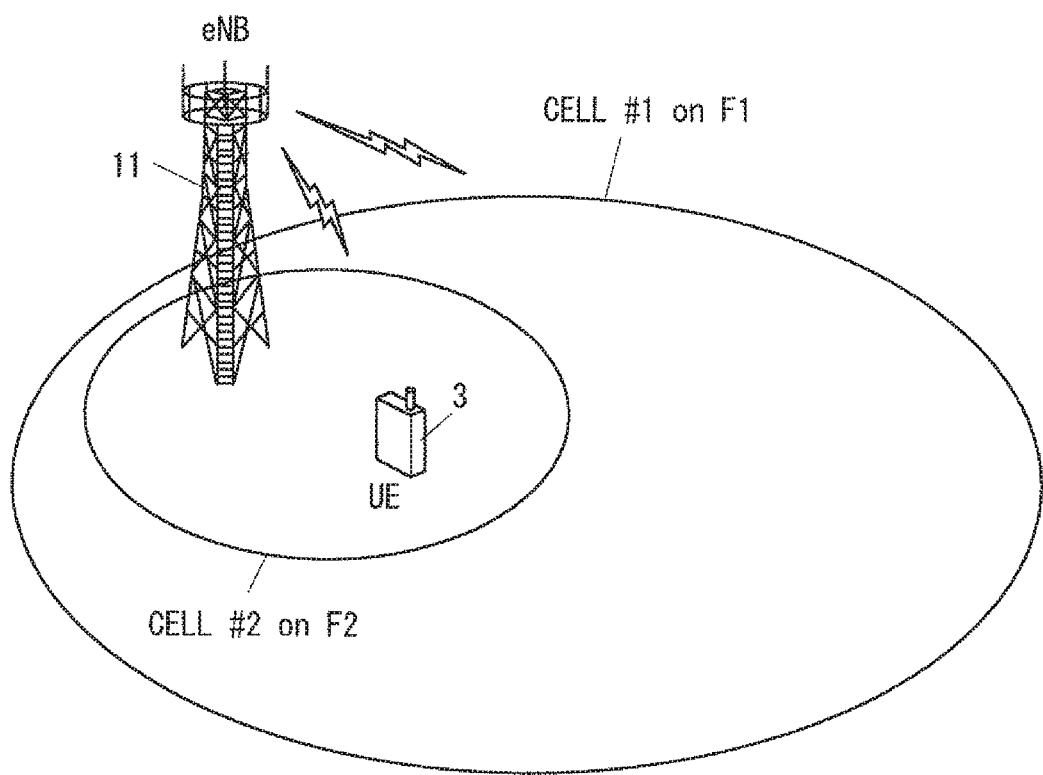
FIG. 1A is a diagram showing a configuration example of a radio communication system according to some embodiments.
Figure 1B:
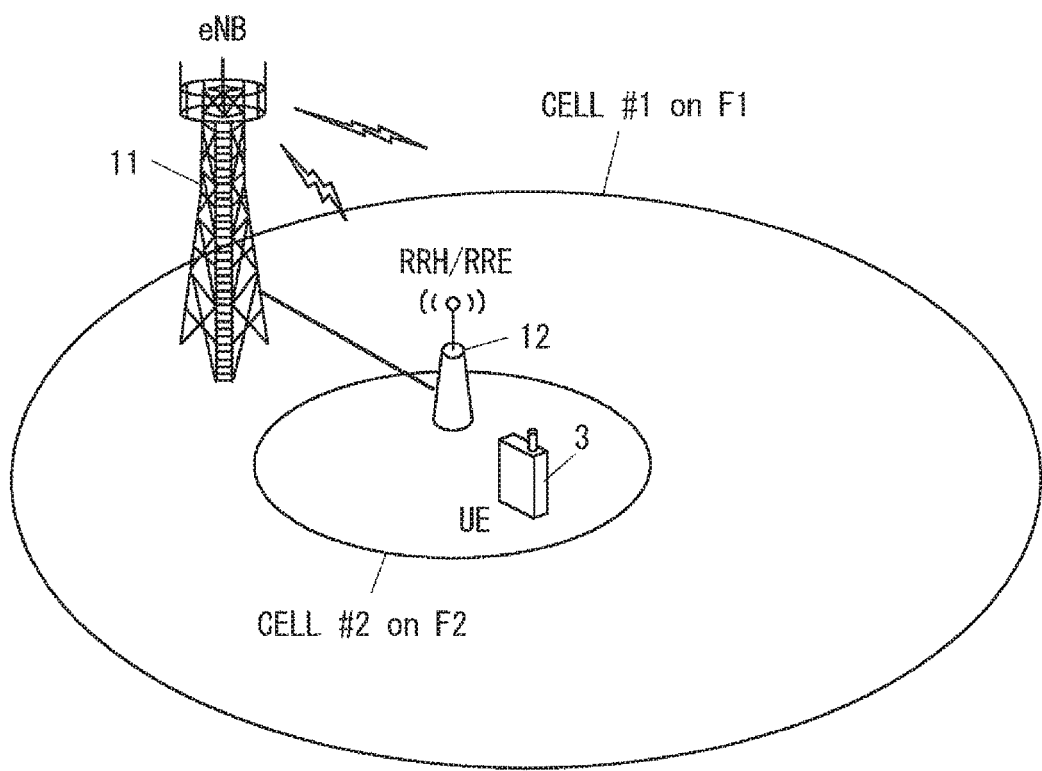
FIG. 1B is a diagram showing a configuration example of a radio communication system according to some embodiments.

FIGS. 1A and 1B are diagrams showing configuration examples of a radio communication system of LTE-U and another system according to the embodiments including this embodiment. In the example shown in FIG. 1A, the radio communication system includes a radio base station (eNB) 11 and a radio terminal (UE) 3 of LTE. The eNB 11 and UE 3 are configured to perform communication according to normal LTE on a licensed frequency (F1) and to perform communication according to LTE-U on an unlicensed frequency (F2). Besides the example shown in FIG. 1A, in the example shown in FIG. 1B, the LTE eNB 11 manages a remote base station 12 (RRH or RRE) and uses this remote base station 12 to perform communication according to LTE-U on the unlicensed frequency (F2).

The configuration shown in FIG. 1A and that shown in FIG. 1B may coexist in the same system. Further, FIGS. 1A and 1B show only a part of the radio communication system that is considered in this example. In reality, there are a plurality of eNBs and their RRHs/RREs and a plurality of UEs around the eNB 11, the RRH/RRE 12, and the UE 3, and a plurality of cells on the licensed frequency are managed by these eNBs and RRHs/RREs. Further, there may be a plurality of WLAN APs and a plurality of WLAN Terminals around the eNB 11, the RRH/RRE 12, and the UE 3. In the following description, the term "radio base station 1" or "LTE-U eNB 1" is used to indicate any eNB having the function of LTE-U. That is, the radio base station 1 or the LTE-U eNB 1 corresponds to the eNB 11 in the configuration shown in FIG. 1A and corresponds to the eNB 11 and the RRH/RRE 12 in the configuration shown in FIG. 1B. For the sake of convenience of explanation, only a node corresponding to the RRH/RRE 12 n the configuration shown in FIG. 1B may be referred to as the radio base station 1 or the LTE-U eNB 1.

In the above and following description, it is assumed that LTE-U is implemented using LAA (also referred to as LA-LTE). As already stated above, in LAA, the radio base station (LTE-U eNB) 1 and the radio terminal (UE) 3 perform carrier aggregation (CA) of a cell on the licensed frequency and a cell on the unlicensed frequency, use the cell on the licensed frequency as a primary cell (PCell), and use the cell on the unlicensed frequency as a secondary cell (SCell). As already stated above, LTE-U may be executed using a shared frequency (Shared frequency band, Shared spectrum) allocated to a plurality of operators (service providers) instead of using the unlicensed frequency. In this case, LTE-U may be achieved by the aforementioned LAA or a scheme similar to LAA. Alternatively, the LTE-U eNB 1 and the UE 3 may perform CA using a plurality of shared frequencies (e.g., two frequencies F3 and F4), and execute normal LTE in a PCell on one of two shared frequencies (F3) and execute LTE-U in a SCell on the other shared frequency (F4). As already stated above, LTE-U using a shared frequency is specifically referred to as Licensed Shared Access (LSA). Furthermore, the LTE-U eNB 1 and the UE 3 may perform CA using a shared frequency allocated to a plurality of operators (e.g., F3) and an unlicensed frequency in a narrow sense that is not allocated to any operator (e.g., F2 (e.g., 5 GHz band)), and execute normal LTE in a PCell on the shared frequency (F3) and execute LTE-U in a SCell on the unlicensed frequency in a narrow sense (F2).

Figure 2:
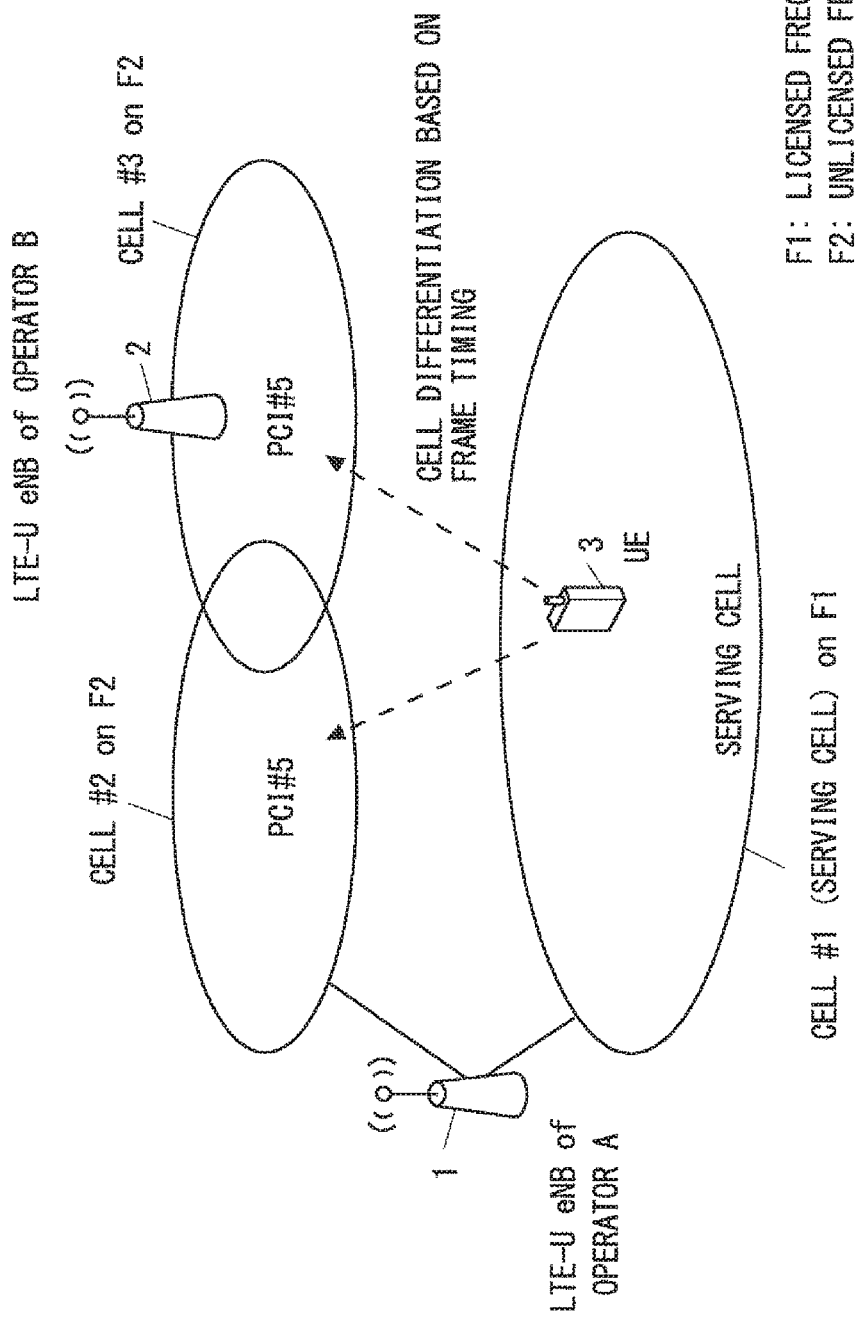
FIG. 2 is a diagram showing a configuration example of a radio communication system according to some embodiments.

FIG. 2 shows an example of a situation in which a plurality of cells provided by different LTE operators use the same PCI. In the example of FIG. 2, the LTE-U eNB 1 is managed by an operator A, operates the Cell #1 on the licensed frequency F1, and operates the Cell #2 on the unlicensed frequency F2. The Cell #2 has PCI #5. On the other hand, an LTE-U eNB 2 is managed by another operator B different from the operator A and operates a Cell #3 on the unlicensed frequency F2. In the example of FIG. 2, the Cell #2 and Cell #3 are adjacent to each other and have the same PCI #5, and there is thus a possibility that the LTE-U eNB 1 and UE 3 experience a PCI collision. Instead, the Cell #2 and Cell #3 having the same PCI #5 may be located not adjacent to each other and be located adjacent to the Cell #1. In such a case, there is a possibility that the LTE-U eNB 1 experiences a PCI confusion.

When a plurality of cells (e.g., Cell #2 and Cell #3) are configured to use the same PCI (e.g., PCI #5) and the same frequency (e.g., F2) as shown in FIG. 2, the UE 3 according to this embodiment operates as described below so as to differentiate these cells from each other. Specifically, the UE 3 is configured to differentiate among cells (e.g., Cell #2 and Cell #3), which are configured to use the same PCI (e.g., PCI #5) and the same frequency (e.g., F2), based on a relationship between the frame timing of a serving cell (e.g., Cell #1) and the frame timings of these cells (e.g., Cell #2 and Cell #3). In other words, if there are a first cell (e.g., Cell #2) and a second cell (e.g., Cell #3) using the same PCI (e.g., PCI #5) and the same frequency (e.g., F2), the UE 3 is configured to differentiate the first cell (e.g., Cell #2) from the second cell (e.g., Cell #3) based on a relationship between the frame timing of the first cell (e.g., Cell #2) and the frame timing of the serving cell (e.g., Cell #1). Note that, the term "frame timing" in this and other embodiments may mean a time when a radio terminal (e.g., UE 3) receives the beginning of a radio frame or subframe (frame boundary) or a time when a radio base station (e.g., eNB 1) transmits the beginning of a radio frame or subframe (frame boundary). Instead, the term "frame timing" may mean a time when a radio terminal receives a synchronization signal (e.g., PSS, SSS) or a time when a radio base station transmits a synchronization signal (e.g., PSS, SSS).

Figure 3:
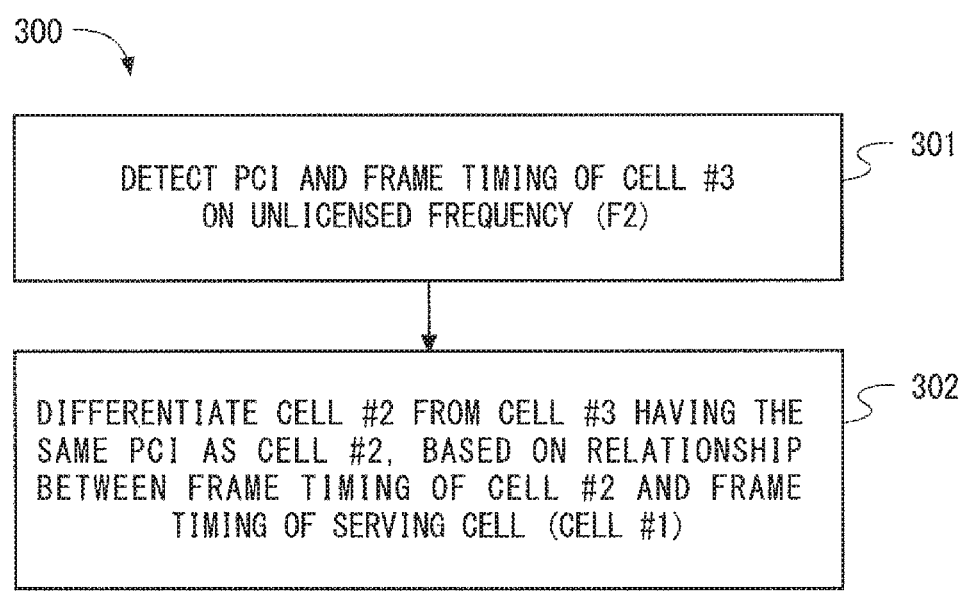
FIG. 3 is a flowchart showing an example of an operation of a radio terminal according to a first embodiment.

FIG. 3 is a flowchart showing an example (process 300) of a process performed by the UE 3. In Block 301, the UE 3 detects the PCI and the frame timing of the Cell #2 on the unlicensed frequency (F2). In Block 302, the UE 3 differentiates the Cell #2 from the Cell #3, which has the same PCI as the Cell #2, based on the relationship between the frame timing of the Cell #2 and the frame timing of the serving cell (Cell #1).

The relationship with respect to the frame timing may be, for example, a frame timing difference between the radio frame of a cell on the unlicensed frequency (e.g., Cell #2 or Cell #3) and that of the serving cell (e.g., Cell #1), which have been received by the UE 3. That is, cells (e.g., Cell #2 and Cell #3) using the same PCI (e.g., PCI #5) and the same frequency (e.g., F2) have different frame-timing differences from the frame timing of the serving cell, and these cells thereby can be differentiated from each other. The frame timing difference may be defined as a difference between the beginning of the radio frame (i.e., radio frame boundary) of the cell on the unlicensed frequency and that of the serving cell, which have been received by the UE 3. More specifically, the frame timing difference may be defined as a time difference (e.g., N nanoseconds, M microseconds) between the beginning of the radio frame (i.e., radio frame boundary) of the cell on the unlicensed frequency and that of the serving cell, which have been received by the UE 3. Alternatively, the frame timing difference may be defined as a difference between the subframe number of the cell on the unlicensed frequency and that of the serving cell, which have been received by the UE 3 at the same observing time. Further alternatively, the frame timing difference may be defined as a time difference between the subframe in which the synchronization signal (e.g., PSS, SSS) is transmitted in the cell on the unlicensed frequency and that of the serving cell, which have been received by the UE 3.

When the frame structure (i.e., duplex mode (FDD or TDD)) of the serving cell differs from that of the cell on the unlicensed frequency, this difference may be taken into consideration. That is, although regardless of the frame structure, both the first synchronization signal (PSS) and second synchronization signal (SSS) are transmitted in the first subframe (subframe #1) and the sixth subframe (subframe #6), the radio resources in which the PSS and SSS are actually transmitted slightly differ depending on the frame structures. For example, in the case of the frame structure type 1 (FDD), the first synchronization signal (PSS) is transmitted in the last OFDM symbols of the slot #0 and slot #10, while in the case of the frame structure type 2 (TDD), the first synchronization signal (PSS) is transmitted in the third OFDM symbols of the subframe #1 and subframe #6. Further, in the case of the frame structure type 1 (FDD), the second synchronization signal (SSS) is transmitted in the slot #0 and slot #10, while in the case of the frame structure type (TDD), the second synchronization signal (SSS) is transmitted in the slot #1 and slot #11. Accordingly, in order to derive timing information (e.g., frame timing difference mentioned above) finer than 1-millisecond subframe, e.g., in a microsecond order, this difference between the frame structures may be taken into consideration.

As another example, the relationship with respect to the frame timing may be a difference in System Frame Numbers (SFNs) of the cell on the unlicensed frequency and the serving cell. The SFN is a number between 0 and 1023 that is sequentially given to a radio frame. The eight most significant bits of the SFN are obtained by the UE 3 by decoding the Physical Broadcast Channel (PBCH) containing the Master Information Block (MIB). Further, the four least significant bits of the SFN are obtained by the UE 3 by receiving the MIBs (i.e., PBCHs), which are repeatedly transmitted every 10 milliseconds, and detecting its repetition pattern. In this case, cells (e.g., Cell #2 and Cell #3) using the same PCI (e.g., PCI #5) and the same frequency (e.g., F2) have different SFNs each other, and these cells thereby can be differentiated from each other.

As is understood from the above description, even when two or more cells use the same cell identifier (e.g., PCI), the UE 3 of this embodiment can differentiate these cells from each other based on the relationship between the frame timings of these cells and that of a serving cell.

Second Embodiment

This embodiment provides another example of the process performed by the UE and eNB. A configuration example of a radio communication system according to this embodiment is the same as that shown in FIGS. 1A, 1B, and 2 described above with respect to the first embodiment.

Figure 4:
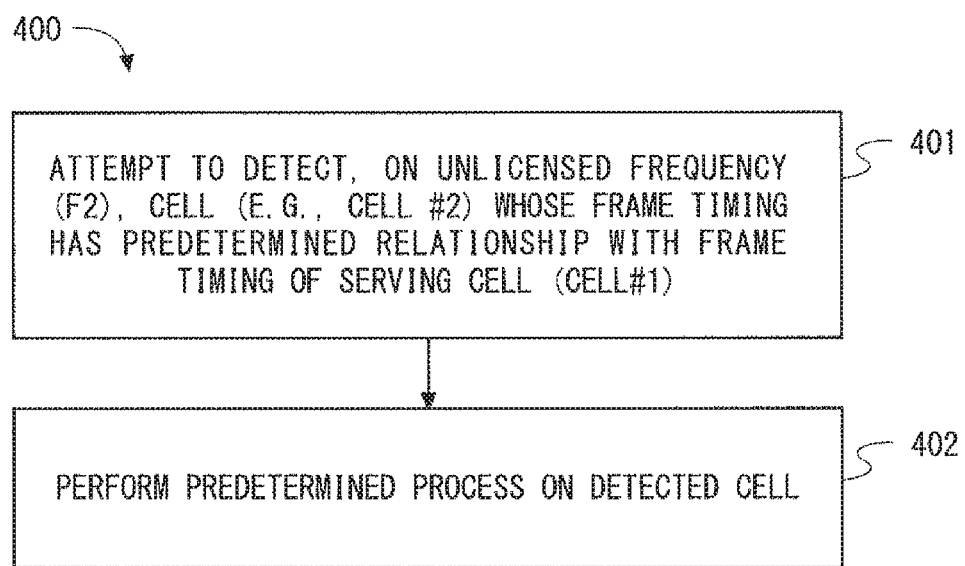
FIG. 4 is a flowchart showing an example of an operation of a radio terminal according to a second embodiment.

FIG. 4 is a flowchart showing an example (process 400) of a process performed by the UE 3. In Block 401, the UE 3 attempts to detect, on the unlicensed frequency F2, a cell (e.g., Cell #2) whose frame timing has a predetermined relationship with the frame timing of the serving cell (Cell #1).

As an example, the predetermined relationship with respect to the frame timing may be a relationship such that the beginning of the radio frame (radio frame boundary) of the cell (e.g., Cell #2 or Cell #3) on the unlicensed frequency and that of the serving cell (e.g., Cell #1), which have been received by the UE 3, are substantially aligned with each other. When the beginnings of the radio frames of two cells are "substantially aligned", it can be said that the radio frames of these two cells are substantially synchronized. When a time difference between the beginnings of the radio frames of two cells received by the UE 3 is within a predetermined threshold (e.g., tens of microseconds to hundreds of microseconds), it may be determined that the beginnings of the radio frames of these two cells are "substantially aligned". Alternatively, when the subframe numbers of two cells received by the UE 3 within a certain observing period (e.g., one subframe period, i.e., 1 millisecond) are the same, it may be determined that beginnings of the radio frames of these two cells are "substantially aligned"

Figure 5:
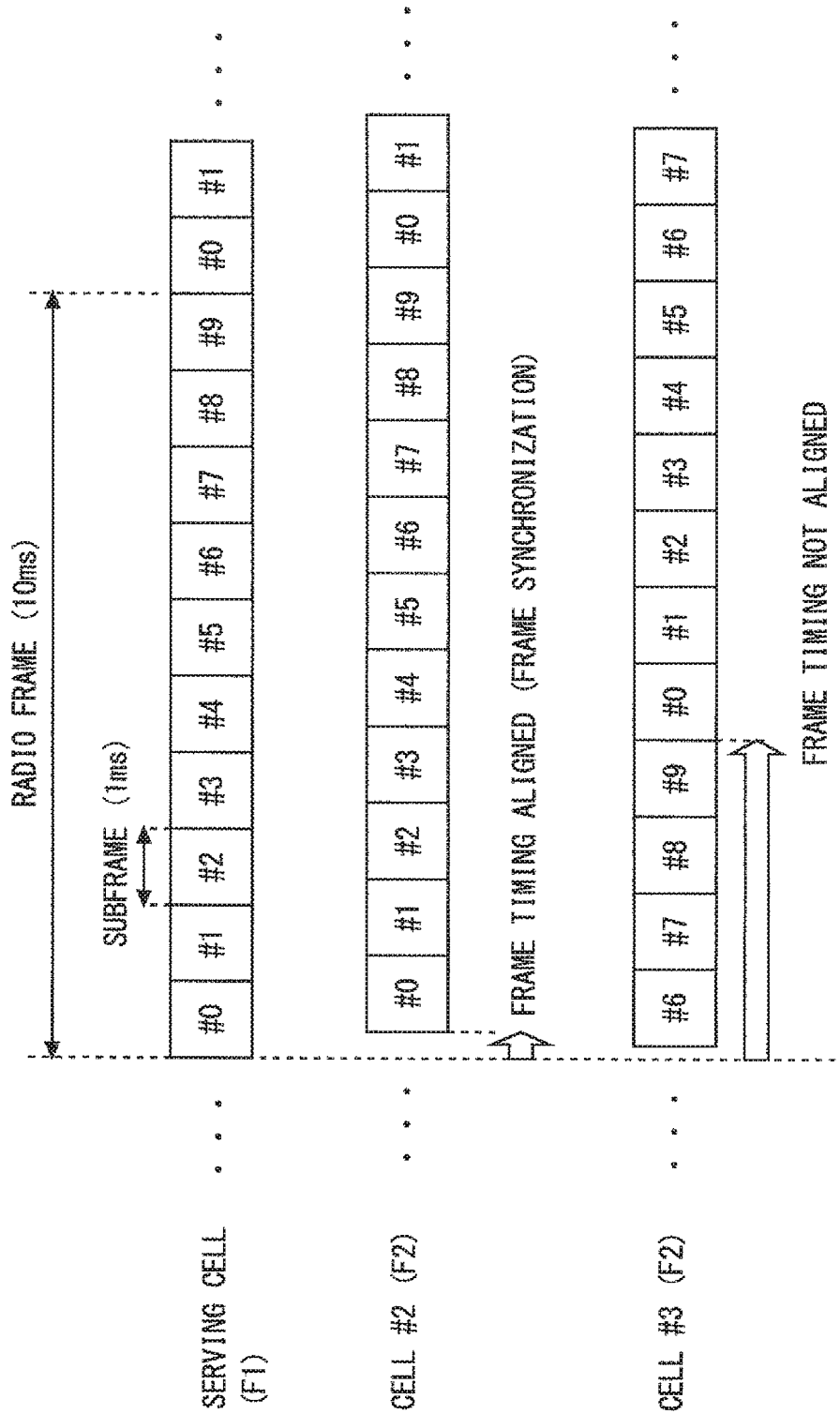
FIG. 5 is a timing diagram showing an example of a relationship between a frame timing of a serving cell and those of other cells.

FIG. 5 shows an example of the relationship between the frame timing of the serving cell and those of other cells. In the example of FIG. 5, the beginning of the radio frame of the Cell #2 and that of the serving cell (Cell #1), which have been received by the UE 3, are substantially aligned with each other. On the other hand, the beginning of the radio frame of the Cell #3 is not aligned with that of the serving cell (Cell #1). Accordingly, in the above example, the UE 3 considers the Cell #2 shown in FIG. 5 as a cell to be subjected to a predetermined process. On the other hand, if the frame timing of the cell on the unlicensed frequency (e.g., Cell #3 shown in FIG. 5) is not aligned with that of the serving cell (Cell #1), the UE 3 does not consider the cell (Cell #3) as a cell (i.e., candidate) to be subjected to the predetermined process.

The UE 3 may attempt to detect, on the unlicensed frequency, a cell(s) (candidate(s)) to be subjected to the predetermined process, while assuming that the frame timing of a cell on the unlicensed frequency that can be used as a secondary cell in LAA is aligned with that of the serving cell. In other words, when the UE 3 receives, from the LTE-U eNB 1, control information that is a trigger for causing the UE 3 to detect a cell on the unlicensed frequency (e.g., measurement configuration for Unlicensed frequency/band), the UE 3 performs cell detection while assuming that the frame timing of a cell that can be used as a secondary cell in LAA on the unlicensed frequency specified by the control information is aligned with the frame timing of the serving cell. Here, the serving cell may be the PCell, a cell similar to the PCell (e.g., PSCell in Dual Connectivity), a serving cell in a predetermined cell group, or all serving cells for the radio terminal.

As another example, the predetermined relationship regarding the frame timing may be a relationship such that, in addition to the beginnings of the radio frames of the cell on the unlicensed frequency and the serving cell received by the UE 3 being substantially aligned (i.e., radio frames being synchronized), these two cells have the same System Frame Number (SFN). As mentioned earlier, the SFN is a number between 0 and 1023 that is sequentially given to a radio frame.

As another example, the predetermined relationship with respect to the frame timing may be a relationship such that the frame timing (e.g., beginning of a radio frame, or radio frame boundary) of the cell on the unlicensed frequency (e.g., Cell #2 or Cell #3) received by the UE 3 is within, or not within, a first predetermined offset from that of the serving cell (e.g., Cell #1) received by the UE 3. In this case, for example, the UE 3 attempts to detect a cell on the unlicensed frequency, evaluates whether the detected cell satisfies the predetermined relationship (i.e., whether the frame timing difference is within, or not within, the first offset), and considers the detected cell as a cell to be subjected to the predetermined process (only) if the detected cell satisfies the predetermined relationship.

Here, a value of the first predetermined offset may be defined by a time difference (e.g., X msec) between the beginnings of the radio frames (radio frame boundary) of two cells or may be defined by a difference between the subframe numbers (e.g., Y subframes) of two cells received within a certain observing period (e.g., one subframe period, i.e., 1 millisecond). A value of the predetermined offset may be positive or negative. When the value of the predetermined offset is zero, it means that the beginnings of radio frames (or radio frame boundary) of the two cells are substantially aligned.

Figure 6:
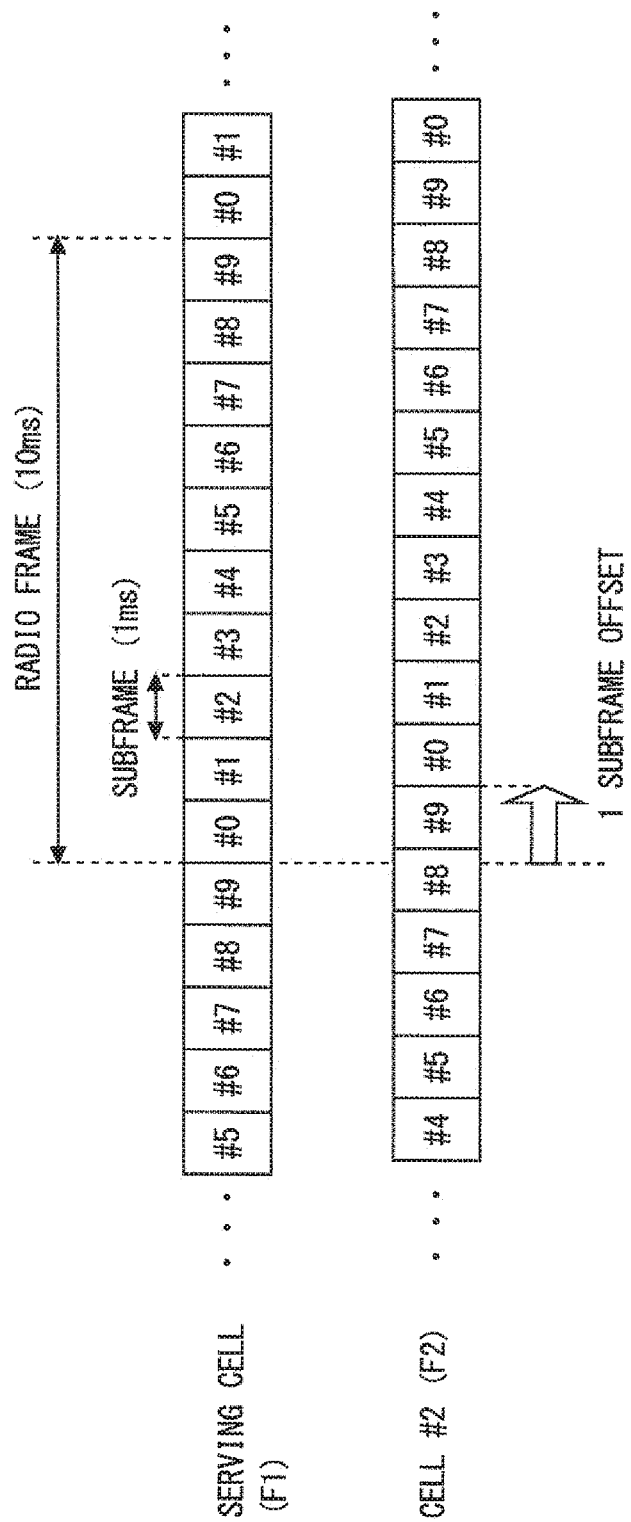
FIG. 6 is a timing diagram showing an example of a relationship between a frame timing of serving cell and that of another cell.

FIG. 6 shows an example of the relationship between the frame timing of the serving cell and that of another cell. In the example of FIG. 6, the beginning of the radio frame of the Cell #2, which has been received by the UE 3, is offset by about one subframe time from that of the serving cell (Cell #1), which has been received by the UE 3. In other words, a difference in subframe numbers received within a certain observing period (e.g., one subframe period, i.e., 1 millisecond) is +1. If the first predetermined offset is set to one subframe (or difference in subframe numbers is equal to 1), the UE 3 may select the Cell #2 shown in FIG. 6 as a cell to be subjected to the predetermined process.

As still another example, the predetermined relationship with respect to the frame timing may be a relationship such that the frame timing (e.g., beginning of radio frame, or radio frame boundary) of the cell on the unlicensed frequency received by the UE 3 is shifted by a second predetermined offset from that of the serving cell received by the UE 3. In this case, for example, when the UE 3 attempts to detect a cell on the unlicensed frequency, the UE 3 assumes that a frame timing of a cell to be detected is shifted by the second offset from that of the serving cell and therefore attempts to detect a cell on the unlicensed frequency at the corresponding detection timing. Note that a value of the second offset may be defined in a manner similar to the manner in which the value of the first offset is defined.

Figure 7:
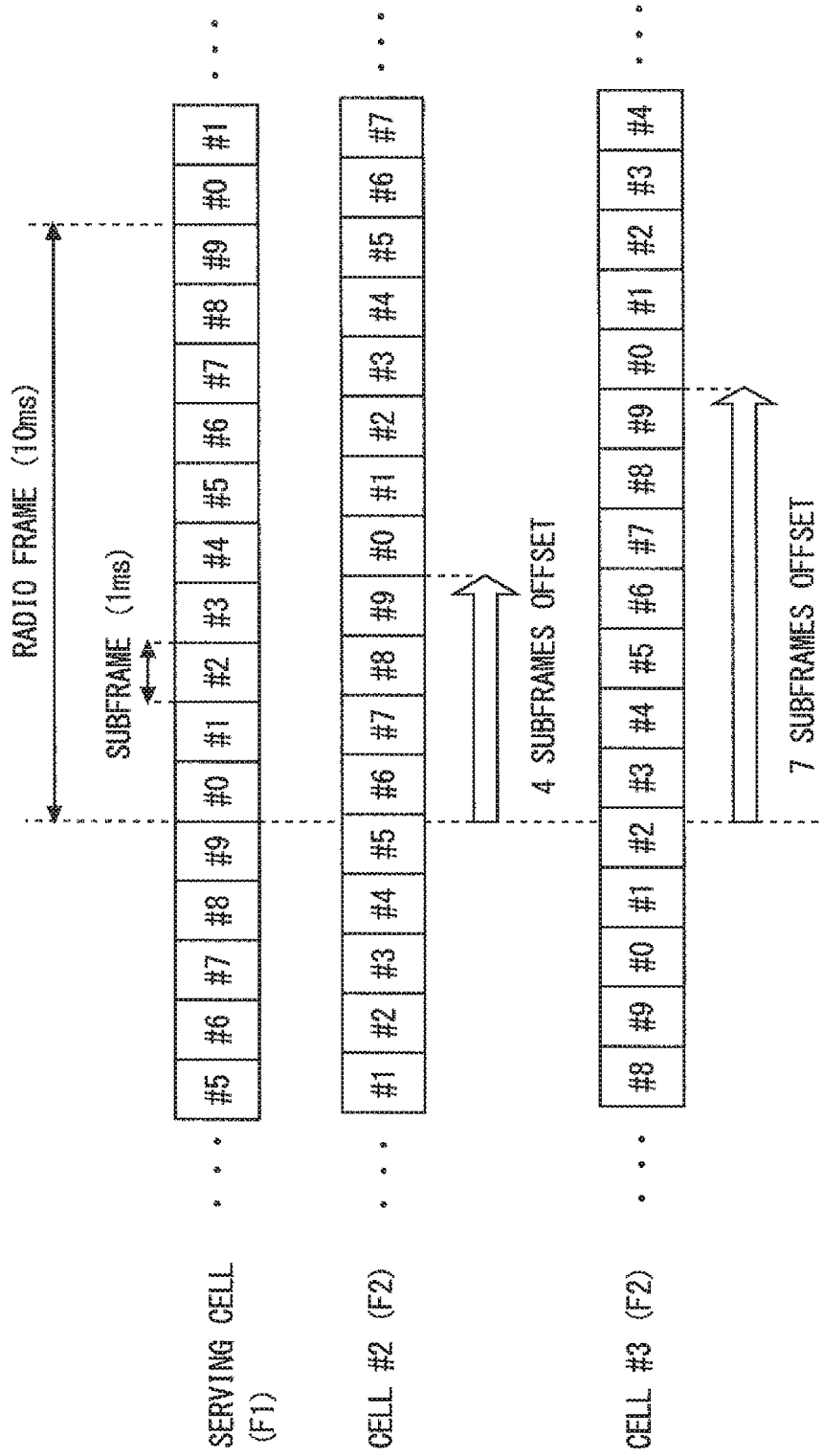
FIG. 7 is a timing diagram showing an example of a relationship between a frame timing of a serving cell and those of other cells.

FIG. 7 shows an example of the relationship between the frame timing of the serving cell and those of other cells. In the example of FIG. 7, the frame timings of the Cell #2 and Cell #3 that can be received by the UE 3 are shown. Here, the "cells that can be received by the UE 3" are cells considered to provide sufficient received quality (e.g., RSRP), at the position where the UE 3 is located, to enable the UE 3 to detect these cells. The beginning of the radio frame of the Cell #2 is shifted from that of the serving cell (Cell #1) by about four subframes. In other words, a difference in subframe numbers received within a certain observing period (e.g., one subframe period, i.e., 1 millisecond) is +6. On the other hand, the beginning of the radio frame of the Cell #3 is shifted from that of the serving cell (Cell #1) by about seven subframes. In other words, a difference in subframe numbers received within a certain observing period (e.g., one subframe period, i.e., 1 millisecond) is +3. If the second predetermined offset is set to four subframes (or difference in subframe numbers is equal to 6), the UE 3 may select the Cell #2 shown in FIG. 7 as a cell to be subjected to the predetermined process. In the example of FIG. 7, in the case that the predetermined process is detection of a cell (i.e., cell search process), the UE 3 attempts to detect the Cell #2 while assuming that there is the second offset, but the UE 3 does not attempt to detect the Cell #3 because the Cell #3 cannot be detected according to the second offset.

As yet another example, the predetermined relationship with respect to the frame timing may be a relationship such that the radio frame number (i.e., SFN) of the cell (e.g., Cell #2 or Cell #3) on the unlicensed frequency received by the UE 3 is within, or not within, the first predetermined offset from that of the serving cell (e.g., Cell #1) received by the UE 3, or is shifted from that of the serving cell (e.g., Cell #1) by the second predetermined offset (e.g., Z radio frames).

Referring back to FIG. 4, in Block 402, the UE 3 performs the predetermined process on the cell(s) detected in Block 401. The predetermined processes may include at least one of the following processes:

Cell search process (cell search);
Cell selection process (cell selection);
Cell reselection process (cell reselection);
Detection of proximity to a cell (proximity estimation);
Reporting of proximity to a cell (proximity indication);
Terminal measurement (RRM measurement);
Reporting of terminal measurement result (RRM measurement report);
Radio quality measurement (CQI measurement);
Reporting of radio quality measurement result (CQI report);
Channel state measurement (CSI measurement);
Reporting of channel state measurement result (CSI report); and
Sensing (CCA, energy detection).

The expression "considering a cell as a cell to be subjected to the cell search process" means that the PSS and SSS sequences of this cell are selected as a candidate for a search performed by the cell search function. The cell search process may be searching for (looking up) a cell for at least one of the following reasons:

(a) To use a cell as a serving cell (e.g., SCell);
(b) To check whether a cell of another operator is present;
(c) To perform measurement on interference from a cell of another operator (inter-operator measurement, inter-operator cell interference measurement, inter-network measurement, or inter-network interference measurement); and
(d) To perform sensing (e.g., CCA, energy detection).

The detection of proximity to a cell may be performed by, for example, the UE 3 autonomously checking (estimating) whether the target cell is present nearby for the purpose of at least one of the above-listed (a) to (d). The detection of proximity to a cell may be referred to as estimation of proximity to a cell (proximity estimation), detection of cell availability, or simply, cell discovery. The detection of proximity to a non-serving cell on an unlicensed frequency performed by the UE 3 includes, for example, detection of a cell-specific signal transmitted from the radio base station (LTE-U eNB) 1 in this non-serving cell. The cell-specific signal contains a known symbol or a known sequence. The cell-specific signal may be, for example, a Synchronization Signal (PSS and SSS in LTE), a Reference Signal (RS), or basic information (Master Information Block: MIB) or system information (System Information Block: SIB, e.g., SIB1 or SIB2 or SIBx defined for LTE-U) broadcasted in the cell. In this case, the UE 3 may detect proximity to a non-serving cell based on, for example, whether the received quality (e.g., RSRP, RSRQ, RSSI, SINR, or CQI) of the cell-specific signal (e.g., RS) is equal to or greater than a predetermined threshold (or greater than the threshold). Instead, the UE 3 may detect proximity to a non-serving cell based on whether it has successfully received the basic information (MIB) or system information (SIB) broadcasted in this non-serving cell. The reference signal may include, for example, at least one of a Cell Specific RS (CRS), a Reference Signal (CSI RS) for a measurement report regarding Channel State Information (CSI), and a Reference Signal for cell detection (Discovery RS: DRS). The DRS may be a combination of two or more of PSS, SSS, CRS, and CSI RS, or may be a new reference signal defined for the cell detection.

The reporting of proximity to a cell includes reporting to the LTE-U eNB 1, in the serving cell (e.g., PCell) on the licensed frequency, a result of the detection of proximity to a cell. This report may be transmitted from the UE 3 to the LTE-U eNB 1 as a Radio Resource Control (RRC) message. This report may include, in addition to the cell identifier (e.g., PCI), timing information in order to identify the detected cell on the unlicensed frequency. This timing information relates to reception of downlink signals by the radio terminal and indicates the relationship between the frame timing of the detected cell and that of the serving cell. This timing information may indicate a difference between the frame timing of the detected cell and that of the serving cell (e.g., difference in time or difference in subframe numbers).

In the description regarding FIG. 4, it has been shown that, as an example of the predetermined relationship with respect to the frame timing, the frame timing (i.e., beginning of radio frame or radio frame boundary) of the cell (e.g., Cell #2 or Cell #3) on the unlicensed frequency received by the UE 3 is shifted by the predetermined offset from that of the serving cell (e.g., Cell #1) received by the UE 3, or is within the predetermined offset. The set value of the predetermined offset used in this example may be transmitted to the UE 3 by the LTE-U eNB 1 in the serving cell (Cell #1). The LTE-U eNB 1 may include the set value of the predetermined offset into configuration information regarding the terminal measurement to be transmitted to the UE 3 (e.g., MeasConfig). Alternatively, the LTE-U eNB 1 may include the set value of the predetermined offset into configuration information regarding the detection of proximity to a non-serving cell to be transmitted to the UE 3 (e.g., proximity configuration for unlicensed frequency).

Figure 8:
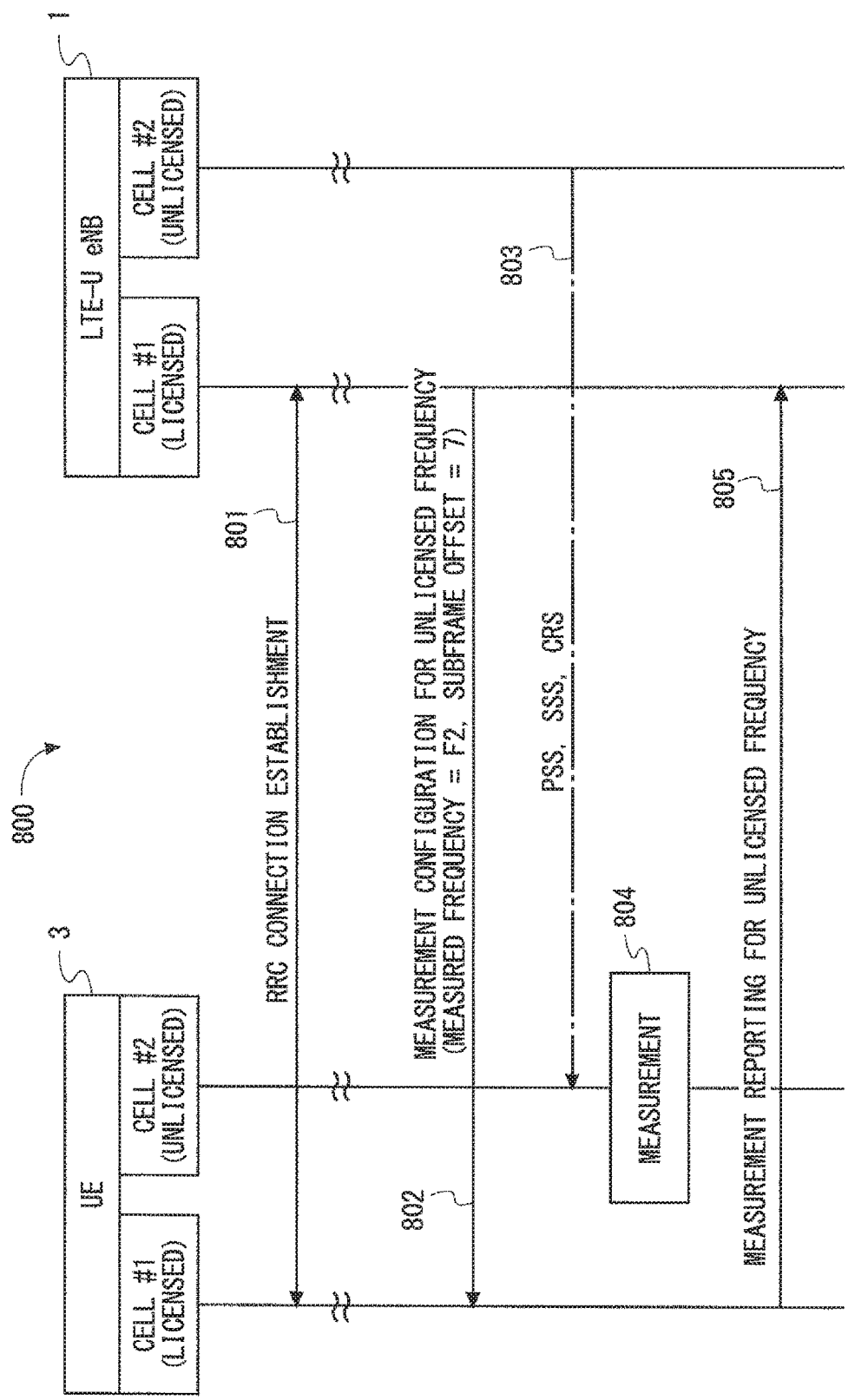
FIG. 8 is a sequence diagram showing an example of a procedure for a radio base station to notify a radio terminal of an offset value.

FIG. 8 is a sequence diagram showing an operation (process 800) of the radio base station (LTE-U eNB) 1 and radio terminal (UE) 3 regarding the terminal measurement. FIG. 8 shows an example in which the set value of the predetermined offset is included in the configuration information (MeasConfig) regarding the terminal measurement. In FIG. 8, like in FIG. 2, the LTE-U eNB 1 manages the cell (Cell #1) on the licensed frequency (F1) and the cell (Cell #2) on the unlicensed frequency (F2).

In FIG. 8, firstly the UE 3 establishes a radio connection with the LTE-U eNB 1 in the Cell #1 (RRC Connection Establishment, 801) and establishes a bearer (e.g. EPS bearer, E-RAB) with a core network (EPC) (not shown). After that, the UE 3 enters a state in which, for example, the UE 3 can transmit and receive user data (not shown). The LTE-U eNB 1 instructs the UE 3 to perform the terminal measurement (UE measurement) on the unlicensed frequency (e.g., F2), by means of a predetermined control signaling in the Cell #1 (Measurement Configuration and Instruction for Unlicensed Frequency (e.g. Cell #2 on F2), 802). In other words, the predetermined control signaling transmitted in the Cell #1 indicates an instruction for the terminal measurement (UE measurement) on the unlicensed frequency (e.g., F2).

The control signaling or the instruction for the terminal measurement (802) indicates the cell identifier (e.g., PCI) and the set value of the predetermined offset in order to identify the cell on the unlicensed frequency on which the terminal measurement is to be performed. The set value of the predetermined offset represents a size of the offset of the frame timing of the cell (e.g., Cell #2) on the unlicensed frequency from the frame timing of the serving cell (e.g., Cell #1). As described earlier, the set value of the predetermined offset may be defined by a time difference (e.g., X msec) between the beginnings of radio frames (radio frame boundary) of two cells or may be defined by a difference between the subframe numbers (e.g., Y subframes) of two cells received in a certain observing period (e.g., one subframe period, i.e., 1 millisecond).

Referring back to FIG. 8, in response to the control signaling (802), that is, in accordance with the instruction for the terminal measurement, the UE 3 performs the terminal measurement in the Cell #2 (Measurement, 804), and reports the result of the measurement result to the LTE-U eNB in the Cell #1 (Measurement Reporting for Unlicensed Frequency (e.g., Cell #2 on F2), 805). In the terminal measurement (804), the UE 3 may identify the PCI and the frame timing of the Cell #2 based on the PSS and SSS transmitted by the LTE-U eNB 1 in the Cell #2 and measure the received power or received quality of the CRS transmitted in the Cell #2.

The predetermined control signaling (802) in the Cell #1 may further specify the cell on the licensed frequency (Cell #1) as a cell to be subjected to the terminal measurement. The terminal measurement (804) may include measurement on the Cell #1 in addition to the measurement on the Cell #2. The reporting of the terminal measurement result to the LTE-U eNB 1 in the Cell #1 (805) may include the measurement result of the Cell #1 in addition to the measurement result of the Cell #2.

Figure 9:
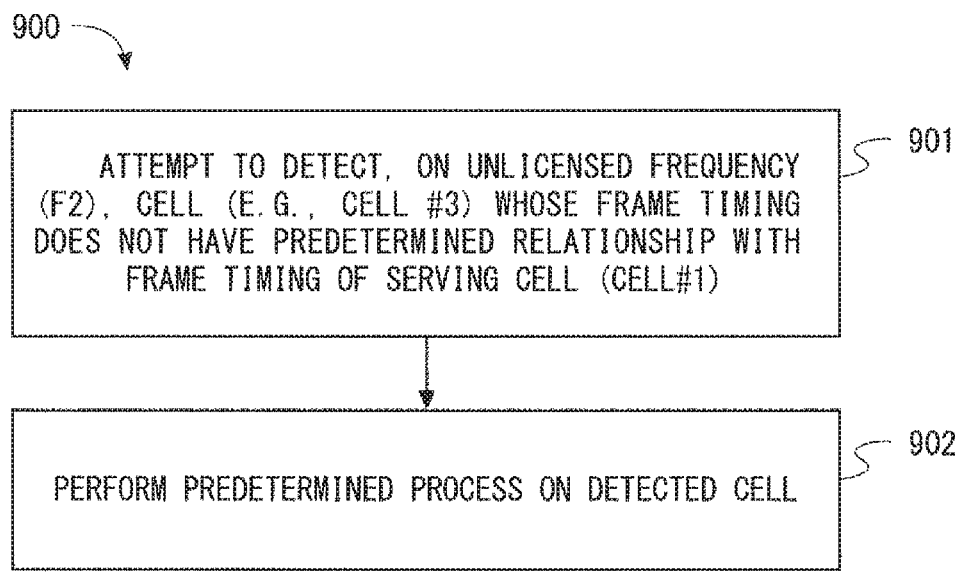
FIG. 9 is a flowchart showing an example of an operation of a radio terminal according to a second embodiment.

FIG. 9 is a flowchart showing another example (process 900) of the process performed by the UE 3. In Block 901, in contrast to the process 400 of FIG. 4, the UE 3 attempts to detect, on the unlicensed frequency F2, a cell (e.g., Cell #3) whose frame timing does not have a predetermined relationship with the frame timing of the serving cell (Cell #1). As already described with respect to FIG. 4, an example of the predetermined relationship with respect to the frame timing may be a relationship such that beginnings of radio frames (radio frame boundary) of two cells are substantially aligned or a predetermined offset is present between the beginnings of the radio frames of the two cells. In Block 902, the UE 3 performs the predetermined process on the cell detected in Block 901. The predetermined process may include at least one of the processes described with respect to FIG. 4.

As is understood from the above description, the UE 3 of this embodiment can perform the predetermined process regarding a target cell on the unlicensed frequency based on the relationship between the frame timing of the serving cell (Cell #1) using the licensed frequency and the frame timing of the target cell (e.g., Cell #2 or Cell #3) using the unlicensed frequency. The UE 3 of this embodiment can therefore contribute to differentiating among cells on the unlicensed frequency according to whether each of these cells has the predetermined relationship with the frame timing of the serving cell (Cell #1). In some implementations, the predetermined relationship may include a relationship such that the frame timing of the target cell (e.g., Cell #2 or Cell #3) is aligned with the frame timing of the serving cell (Cell #1). In some implementations, the predetermined relationship may include a relationship such that the frame timing of the target cell (e.g., Cell #2 or Cell #3) is within, or not within, the first predetermined offset from the frame timing of the serving cell (Cell #1). In some implementations, the predetermined relationship may include a relationship such that the frame timing of the target cell (e.g., Cell

2 or Cell #3) is shifted by the second predetermined offset from the frame timing of the serving cell (Cell #1).

The second embodiment described so far can be implemented as follows.

1. The radio terminal (UE, e.g., UE 3) performs, (without obtaining any information regarding the synchronization of the frame timings from the radio base station (eNB, e.g., LTE-U eNB 1)), the predetermined process (e.g., cell search, terminal measurement, detection of proximity to a cell) on the unlicensed frequency (e.g., F2) based on the assumption that the frame timing of a cell(s) to be detected on the unlicensed frequency is synchronized with that of the serving cell (e.g., Cell #1) on the licensed frequency (e.g., F1). Note that a trigger for the predetermined process may be reception from the eNB of the control information regarding the predetermined process. On the other hand, the eNB operates the second cell (e.g., Cell #2) on the unlicensed frequency (e.g., F2) synchronizing with the first cell (e.g., Cell #1) on the licensed frequency (e.g., F1), and transmits to the UE the control information that is the trigger for the predetermined process on the second cell. This control information may be transmitted in a UE-specific message (RRC signaling, e.g., RadioResourceConfigDedicated) or in broadcast information (SIB).

2. The radio terminal (UE, e.g., UE 3) receives a predetermined allowable offset (first offset, e.g., allowable value of a shift in frame timing or a shift in detection timing of synchronization signals (PSS, SSS)) from the radio base station (eNB, e.g., LTE-U eNB 1), and performs the predetermined process only on a cell(s) (e.g., Cell #2) on the unlicensed frequency (e.g., F2) having an offset that falls within the allowable offset. The trigger for the predetermined process may be reception from the eNB of the control information regarding the predetermined process together with or separately from the allowable offset value. On the other hand, the eNB operates the second cell (e.g., Cell #2) on the unlicensed frequency (e.g., F2) synchronizing with the first cell (e.g., Cell #1) on the licensed frequency (e.g., F1), and transmits the control information and the allowable offset to the UE. The control information is the trigger for the predetermined process on the second cell. The allowable offset is used for determining a cell(s) to be subjected to the predetermined process. The control information and the allowable offset are transmitted in a UE-specific message (RRC signaling, e.g., RadioResourceConfigDedicated) or in broadcast information (SIB). The control information and the allowable offset may be transmitted to the UE in the same message or separate messages.

3. The radio terminal (UE, e.g., UE 3) receives the value of the predetermined offset (second offset, e.g., difference in frame timings or difference in detection timings of synchronization signals (PSS, SSS)) from the radio base station (eNB, e.g., LTE-U eNB 1) and performs the predetermined process (only) on a cell(s) (e.g., Cell #2) on the unlicensed frequency (e.g., F2) having this offset. The trigger for the predetermined process may be reception from the eNB of the control information regarding the predetermined process together with or separately from the offset value. On the other hand, the eNB operates the second cell (e.g., Cell #2) on the unlicensed frequency (e.g., F2) with the predetermined time offset from the first cell (e.g., Cell #1) on the licensed frequency (e.g., F1), and transmits to the UE the offset value and the control information. The control information is the trigger for the predetermined process on the second cell. The offset value and the control information are transmitted in a UE-specific message (RRC signaling, e.g., RadioResourceConfigDedicated) or in broadcast information (SIB). The offset value and the control information may be transmitted to the UE in the same message or separate messages.

Third Embodiment

This embodiment provides another example of the process performed by the UE and eNB. A configuration example of a radio communication system according to this embodiment is the same as that shown in FIGS. 1A, 1B, and 2 described above with respect to the first embodiment.

The UE 3 of this embodiment is configured to, when detecting at least one (e.g., Cell #3) of the cells (e.g., Cell #2 and Cell #3) on the unlicensed frequency that are configured to use the same cell identifier and the same frequency, transmit the timing information regarding the frame timing of the detected cell and the cell identifier (e.g., PCI) of the detected cell to the LTE-U eNB 1 in the serving cell (Cell #1). This timing information indicates the relationship between the frame timing of the detected cell (e.g., Cell #3) and the frame timing of the serving cell (Cell #1). This timing information may indicate a difference between the frame timing of the detected cell (e.g., Cell #3) and that of the serving cell (Cell #1) (e.g., difference in time or difference in frame numbers).

In some implementations, the LTE-U eNB 1 may compare the timing information and cell identifier received from the UE 3 with the frame timing and cell identifier of cell(s) (e.g., Cell #2) on the unlicensed frequency operated by the LTE-U eNB 1 or the operator A that manages the LTE-U eNB 1 in the vicinity of the serving cell (Cell #1). Then, if the cell identifier (e.g., PCI) of the detected cell (e.g., Cell #3) matches that of a cell (e.g., Cell #2) on the unlicensed frequency operated by the LTE-U eNB 1 or the operator A and if the frame timings of these two cells are not aligned, the LTE-U eNB 1 may detect a conflict in cell identifier occurring between the detected cell (e.g., Cell #3) and the cell (e.g., Cell #2) operated by the LTE-U eNB 1 or the operator A. In some implementations, this process may be performed by another control node (e.g., Self-Organizing Network (SON) controller, Software-Defined Network (SDN) controller, Operations Support System (OSS), or Element Management System (EMS)) different from the LTE-U eNB 1.

Figure 10:
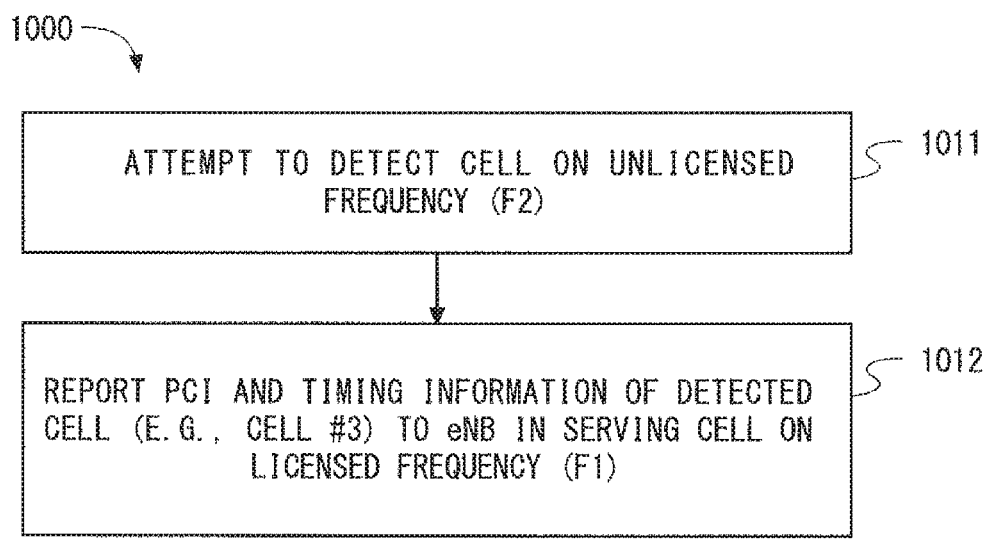
FIG. 10 is a flowchart showing an example of an operation of a radio terminal according to a third embodiment.

FIG. 10 is a flowchart showing an example (process 1000) of a process performed by the UE 3 of this embodiment. In Block 1011, the UE 3 attempts to detect a cell(s) on the unlicensed frequency (F2). The cell detection process (1011) may be performed in the terminal measurement (RRM measurement) or in the detection of proximity to a cell (proximity detection), with which the LTE-UE eNB 1 has configured the UE 3. In Block 1011, the UE 3 identifies the cell detected on the unlicensed frequency (F2) based on not only the cell identifier (e.g., PCI) but also the relationship between the frame timing of the detected cell and that of the serving cell (Cell #1). That is, even when the UE 3 detects a plurality of cells using the same PCI on the unlicensed frequency (F2), the UE 3 can differentiate among these cells based on the relationship between the frame timings of the detected cells and that of the serving cell (Cell #1).

In Block 1012, the UE 3 transmits to the LTE-U eNB 1, in the serving cell (Cell #1), the timing information regarding the frame timing of the detected cell (e.g., Cell #3) and the PCI of the detected cell (e.g., Cell #3). As has been described above, the timing information indicates the relationship (e.g., frame timing difference) between the frame timing of the detected cell (e.g., Cell #3) and the frame timing of the serving cell (Cell #1).

The UE 3 of this embodiment can provide a network (e.g., eNB 1 or other control nodes) with information (i.e., timing information regarding the frame timing) useful for detecting a PCI conflict. Therefore, in this embodiment, the UE 3 can support the network to detect a PCI conflict, i.e., a PCI collision or a PCI confusion.

Fourth Embodiment

This embodiment provides another example of the process performed by the UE and eNB. A configuration example of a radio communication system according to this embodiment is the same as that shown in FIGS. 1A, 1B, and 2 described above with respect to the first embodiment.

Figure 11:
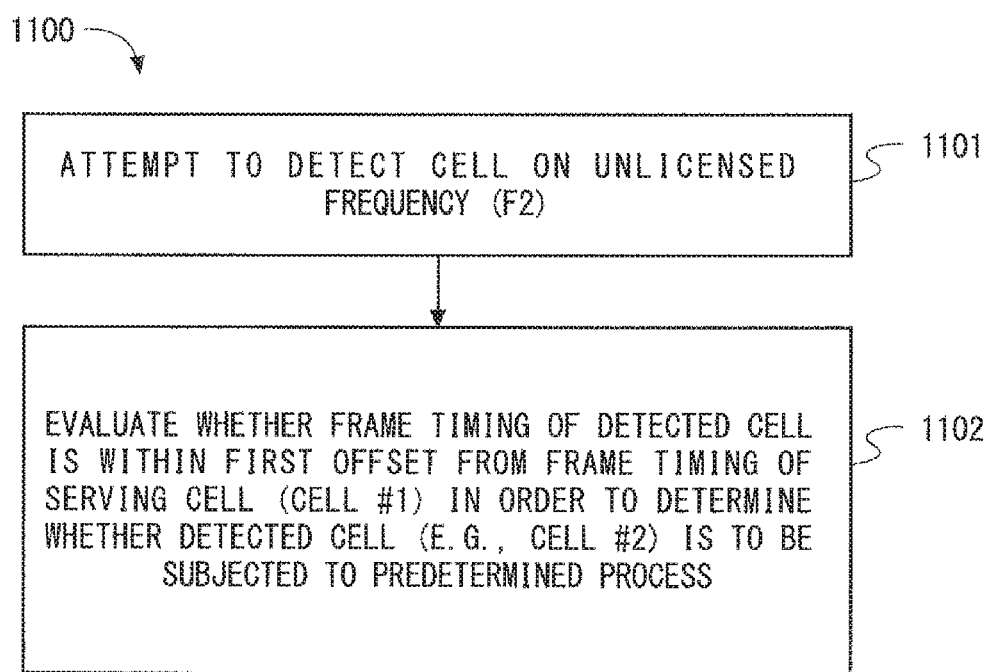
FIG. 11 is a flowchart showing an example of an operation of a radio terminal according to a fourth embodiment.

FIG. 11 is a flowchart showing an example (process 1100) of a process performed by the UE 3 of this embodiment. In Block 1101, the UE 3 attempts to detect a cell(s) on the unlicensed frequency (F2). The cell detection process (1101) may be performed in the terminal measurement (RRM measurement) or in the detection of proximity to a cell (proximity detection), with which the LTE-U eNB 1 has configured the UE 3. In Block 1101, the UE 3 identifies the cell detected on the unlicensed frequency (F2) based on not only the cell identifier (e.g., PCI) but also the relationship between the frame timing of the detected cell and that of the serving cell (Cell #1). That is, even when the UE 3 detects a plurality of cells using the same PCI on the unlicensed frequency (F2), the UE 3 can differentiate among these cells based on the relationship between the frame timings of the detected cells and that of the serving cell (Cell #1).

In Block 1102, the UE 3 evaluates whether the frame timing of the detected cell is within the first offset from the frame timing of the serving cell (Cell #1) in order to determine whether the detected cell (e.g., Cell #2) is a cell to be subjected to the predetermined process. In some implementations, if the frame timing of the detected cell is within the first offset from that of the serving cell (Cell #1), the UE 3 may consider the detected cell as a cell to be subjected to the predetermined process. On the contrary, in some implementations, if the frame timing of the detected cell is not within the first offset from that of the serving cell (Cell #1), the UE 3 may consider the detected cell as a cell to be subjected to the predetermined process.

As described in the second embodiment, the predetermined process in this case may include at least one of cell search, cell selection, cell reselection, detection of proximity to a cell, reporting of proximity to a cell, terminal measurement, reporting of terminal measurement result, radio quality measurement, reporting of a radio quality measurement result, channel state measurement, reporting of a channel state measurement result, and sensing. As described in the second embodiment, the value of the predetermined offset may be defined by a time difference (e.g., X msec) between beginnings of radio frames (radio frame boundary) of two cells or may be defined by a difference between the subframe numbers (e.g., Y subframes) of two cells received within a certain observing period (e.g., one subframe period, i.e., 1 millisecond). The first offset (allowable offset) may be transmitted from the LTE-U eNB 1 to the UE 3 using a UE-specific message (RRC signaling) or broadcast information (SIB).

As is understood from the above description, the UE 3 of this embodiment attempts to detect a cell on an unlicensed frequency, actively evaluates the relationship between the frame timing of the detected cell (e.g., Cell #2 or Cell #3) and that of the serving cell (Cell #1), and when the frame timing of the detected cell has the predetermined relationship with that of the serving cell (Cell #1), the UE 3 determines that the detected cell is a cell to be subjected to the predetermined process. Accordingly, the UE 3 of this embodiment can contribute to differentiating among cells on the unlicensed frequency according to whether each of these cells has the predetermined relationship with the frame timing of the serving cell (Cell #1).

Fifth Embodiment

Figure 12:
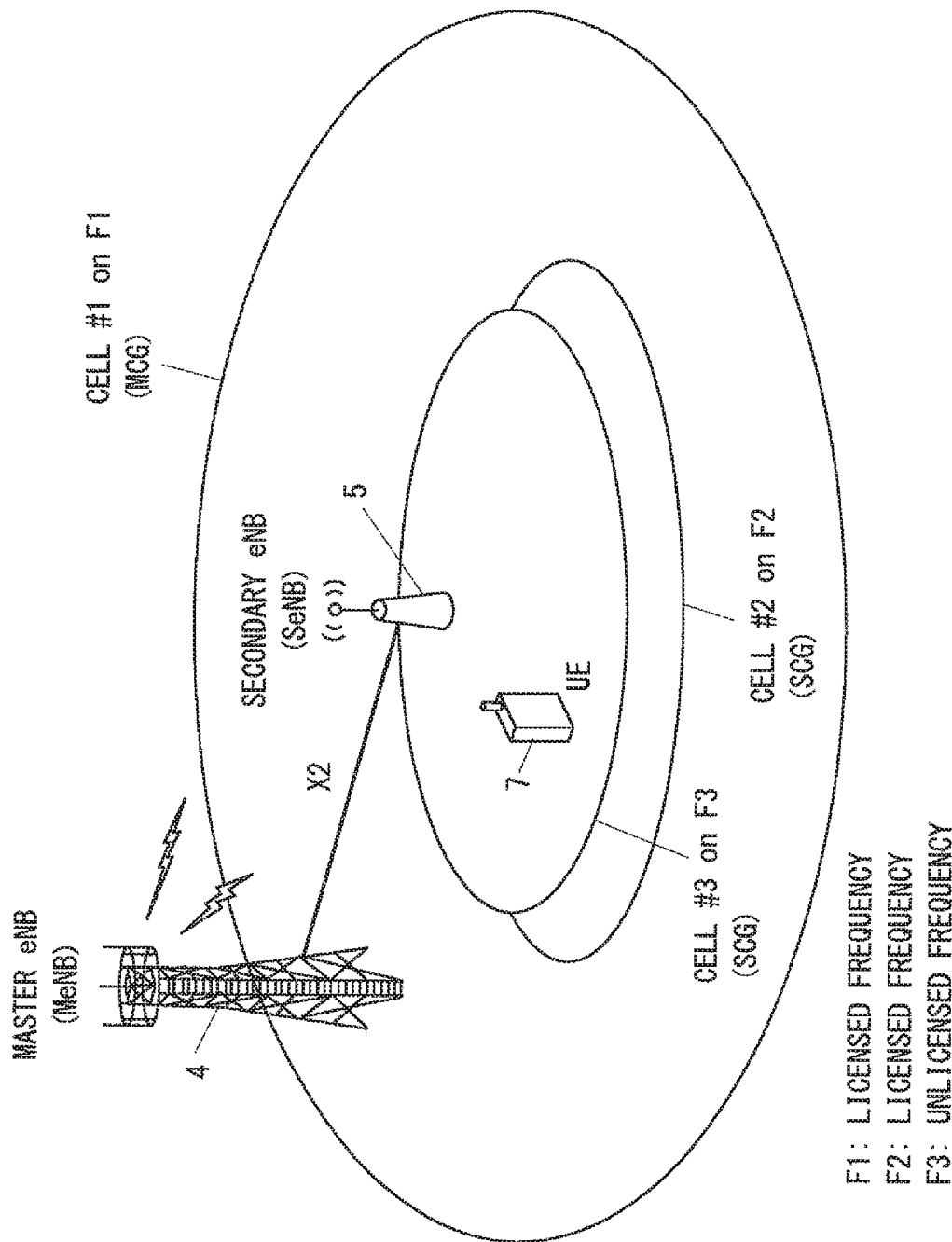
FIG. 12 is a diagram showing a configuration example of a radio communication system according to some embodiments.

The first to fourth embodiments provide examples of LTE-U by the LAA scheme in which CA is performed on licensed and unlicensed frequencies has been described. Meanwhile, in this embodiment, a case in which the LTE-U eNB and UE have the function of Dual Connectivity (DC) will be described. FIG. 12 is a drawing showing a configuration example of a radio communication system according to this embodiment. Radio base stations (eNBs) 4 and 5 and a radio terminal (UE) 7 have the function of Dual Connectivity. Dual Connectivity is a process in which the UE 7 performs communication simultaneously using radio resources (i.e., cells or carriers) provided (i.e., managed) by the main base station (master base station, Master eNB: MeNB) 4 and the sub base station (secondary base station, Secondary eNB: SeNB) 5. In the example of FIG. 12, the MeNB 4 and the SeNB 5 are connected to each other via an X2 interface, the MeNB 4 manages the Cell #1 on the licensed frequency F1, and the SeNB 5 manages the Cell #2 on the licensed frequency F2 and the Cell #3 on the unlicensed frequency F3. The MeNB 4 and SeNB 5 operate as normal LTE eNBs for UEs that do not perform DC and are able to communicate with these UEs in the Cell #1 and Cell #2, respectively.

The UE 7 that supports DC is able to perform Carrier Aggregation (CA) in which cells managed by the MeNB 4 and SeNB 5, respectively, and on different frequencies are simultaneously used as serving cells. The group of serving cells managed by the MeNB 4 is referred to as a Master Cell Group (MCG) and the group of serving cells managed by the SeNB 5 is referred to as a Secondary Cell Group (SCG). The MCG includes at least a Primary Cell (PCell) and may further include one or more Secondary Cells (SCells). The SCG includes at least a Primary SCell (abbreviated as pSCell or PSCell) and may further include one or more SCells. The pSCell is a cell that is assigned with at least a Physical Uplink Control CHannel (PUCCH) and serves as the PCell in the SCG.

The following briefly describes Dual Connectivity (DC). See, for example, Non Patent Literature 5 for details of Dual Connectivity. The MeNB 4 maintains a connection (S1-MME) with a mobility management apparatus (Mobility Management Entity: MME) in a core network (Evolved Packet Core: EPC) for the UE 7 executing DC. For this reason, the MeNB 4 may be referred to as a mobility management point (or mobility anchor) for the UE 7. The control information of the Control Plane (CP) is transmitted between the MeNB 4 and UE 7 in the MCG. The control information of the CP regarding the SCG of the SeNB 5 is transmitted between the SeNB 5 and MeNB 4 (X2 interface) and is also transmitted between the MeNB 4 and UE 7 in the MCG. For example, Radio Resource Configuration of the SCG (e.g. RadioResoureConfigDedicated IE) is transmitted from the SeNB 5 to MeNB 4 in an inter-node RRC message referred to as "SCG-Configuration" and transmitted from the MeNB 4 to the UE 7 in an RRC Connection Reconfiguration message. On the other hand, terminal capability information of the UE 7 (UE-EUTRA capabilities IE), security information about the SCG (e.g., S-K$_{eNB}$), Radio Resource Configuration of the MCG (e.g. RadioResourceConfigDedicated IE) and the like are transmitted from the MeNB 4 to the SeNB 5 in an inter-node RRC message referred to as "SCG-ConfigInfo".

In DC, three different configurations are supported in view of bearer configuration for the User Plane (UP). The first configuration is a MCG bearer. The MCG bearer is a bearer in which radio protocols are arranged only in the MeNB 4 in order to use resources of only the MeNB 4 (e.g., MCG) and a connection (S1-U) is maintained between a gateway apparatus (Serving Gateway (S-GW) or Packet Data Network Gateway (P-GW)) and the MeNB 4, similar to normal LTE that does not perform DC. The second configuration is an SCG bearer. The SCG bearer is a bearer in which the radio protocols are arranged only in the SeNB 5 in order to use resources of only the SeNB 5 (e.g., SCG) and a connection (S1-U) is maintained between the gateway apparatus (S-GW or P-GW) and SeNB 5. The third configuration is a Split bearer. The Split bearer is a bearer in which the radio protocols are arranged in both the MeNB 4 and SeNB 5 in order to use resources of both the MeNB 4 and SeNB 5 (e.g., MCG and SCG). In the Split bearer, a connection (S1-U) is maintained between the gateway apparatus (S-GW or P-GW) and MeNB 4 and UP data (e.g., PDCP PDU) to be transmitted in the SCG is forwarded, for example, from the MeNB 4 to SeNB 5 via the X2. When the SeNB 5 and UE 7, which are executing DC, perform LAA, for example, the SeNB 5 and UE 7 use a cell on an unlicensed frequency as a SCell together with the PSCell of the SCG. In this case, a Radio Bearer corresponding to the SCG bearer or Split bearer is established in the cell on the unlicensed frequency.

Figure 13:
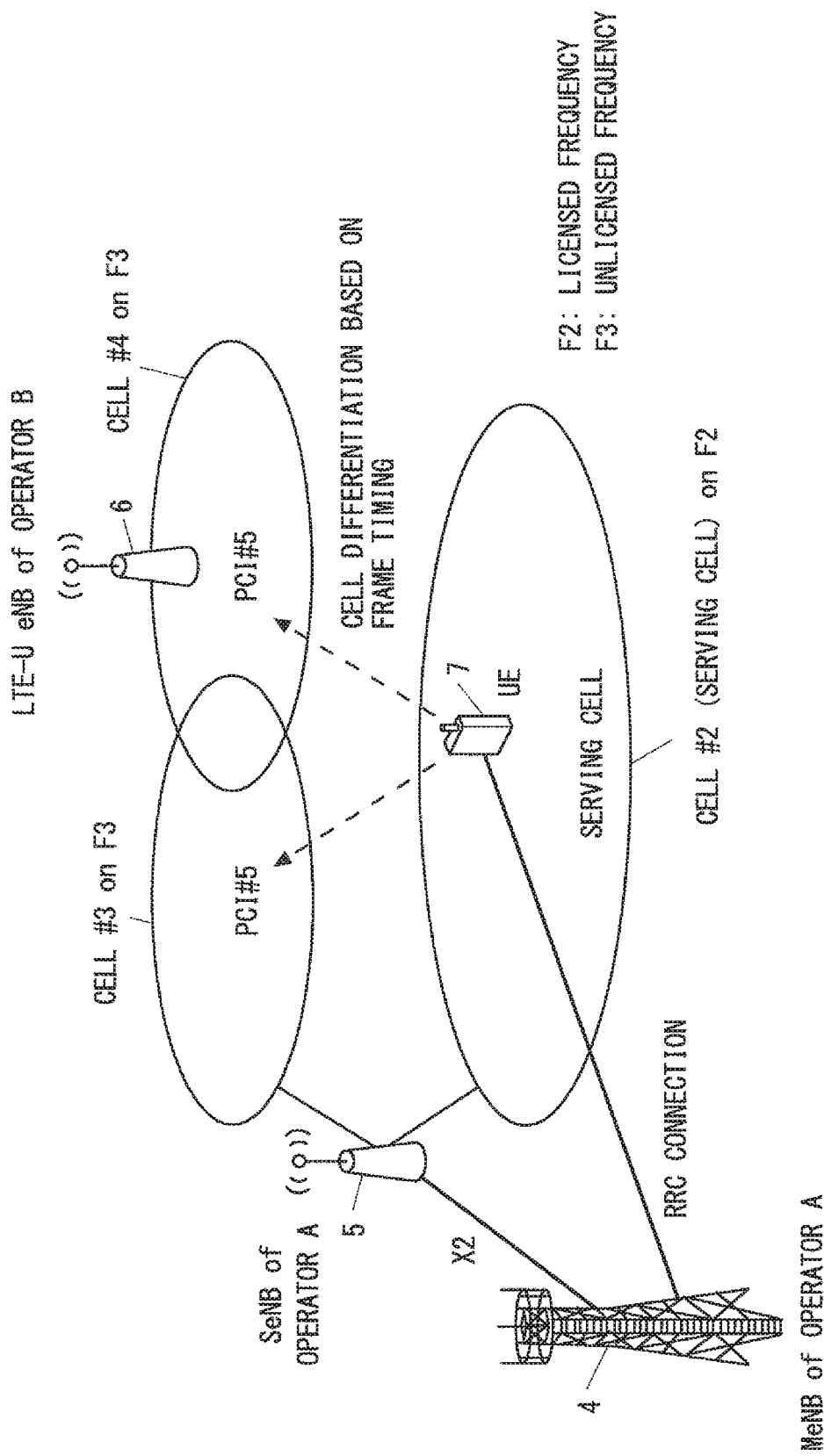
FIG. 13 is a diagram showing a configuration example of a radio communication system according to some embodiments.

FIG. 13 shows an example in which cells respectively provided by different LTE operators use the same PCI. In the example of FIG. 13, the MeNB 4 and SeNB 5, which support Dual Connectivity, are managed by the operator A. The Cell #3 on the unlicensed frequency (F3) has PCI #5. On the other hand, an LTE-U eNB 6 is managed by an operator B different from the operator A and operates the Cell #4 on the unlicensed frequency F3. In the example of FIG. 13, the Cell #3 and Cell #4 are adjacent to each other and have the same PCI #5, and thus a PCI collision occurs. Instead, the Cell #3 and Cell #4 having the same PCI #5 may be located not adjacent each other and be located adjacent to the Cell #2. In such a case, a PCI confusion occurs.

The technique described in the first to fourth embodiments that enables the UE to differentiate among cells on the unlicensed frequency based on the predetermined relationship between the frame timings of the cells on the unlicensed frequency and the frame timing of the serving cell can be applied to the case of Dual Connectivity shown in FIG. 13. Here, the serving cell may be a cell of the MeNB 4 (MCG, e.g., PCell) or a cell of the SeNB 5 (SCG, e.g., PSCell). The SFNs may be or may not be synchronized between the MCG of the MeNB 4 and the SCG of the SeNB 5. If the SFNs are not synchronized and the cell (e.g., PCell) of the MeNB 4 corresponds to the serving cell described in the first and second embodiments, the UE 7 may perform the determination regarding the predetermined relationship in consideration of the difference in the SFNs between the MCG and SCG or may perform the determination regarding the predetermined relationship based on the SFN of the cell (e.g., PCell) of the MeNB 4. In the latter case, the UE 7 may report the difference in the SFNs to the MeNB 4.

Further, the UE 7 may receive the control information including, for example, the values of the first and second offsets from the SeNB 5 in the SCG or from the MeNB 4 in the MCG. This control information may be generated by the SeNB 5 or by the MeNB 4. In the former case, the SeNB 5 may transfer the generated control information (e.g., set value of the offset) to the MeNB 4 in the SCG-Configuration, and then the MeNB 4 may transmit it to the UE 7. Further, the UE 7 may transmit the timing information of the cell detected on the unlicensed frequency (F3) to the SeNB 5 in the SCG or may transmit it to the MeNB 4 in the MCG. In the latter case, the MeNB 4 may transfer the received timing information to the SeNB 5 in, for example, the SCG-ConfigInfo.

Lastly, configuration examples of the radio terminals (UE 3, UE 7) and radio base stations (LTE-U eNB 1, MeNB 4, SeNB 5) according to the above embodiments will be described. Each of the radio terminals (UE 3, UE 7) described in the above embodiments may include a transceiver for communicating with a radio base station (LTE-U eNB 1, MeNB 4, SeNB 5) and a controller coupled to the transceiver. The controller executes the process regarding one of the radio terminals (UE 3, UE 7) described in the above embodiments (e.g., process for differentiating among cells on the unlicensed frequency based on the relationship between the frame timings of these cells and the frame timing of the serving cell).

Each of the radio base stations (LTE-U eNB 1, MeNB 4, SeNB 5) described in the above embodiments may include a transceiver for communicating with a radio terminal (UE 3, UE 7) and a controller coupled to the transceiver. The controller executes the process regarding one of the radio base stations (LTE-U eNB 1, MeNB 4, SeNB 5) described in the above embodiments (e.g., transmission of the set value of the predetermined offset to the UE 3 or UE 7, detection of a PCI conflict based on the timing information received from the UE 3 or UE 7).

Figure 14:
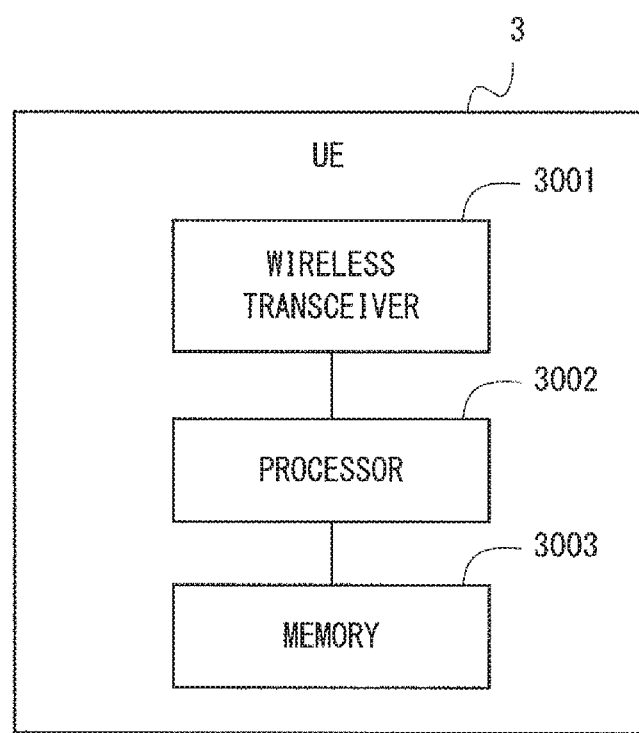
FIG. 14 is a block diagram showing a configuration example of a radio terminal according to some embodiments.

FIG. 14 is a block diagram showing a configuration example of the radio terminal (UE) 3 according to the first to fourth embodiments. The radio terminal 7 of the fifth embodiment may have the same configuration as that shown in FIG. 14. Referring to FIG. 14, the UE 3 includes a wireless transceiver 3001, a processor 3002, and a memory 3003. The wireless transceiver 3001 is configured to communicate with the LTE-U eNB 1.

The processor 3002 loads software (computer program) from the memory 3003 and executes the loaded software, thereby performing the process of the UE 3 regarding the process 300, 400, 800, 900, 1000, or 1100, which has been described in the above embodiments. The processor 3002 may be a microprocessor, a Micro Processing Unit (MPU), or a Central Processing Unit (CPU). The processor 3002 may include a plurality of processors.

The memory 3003 consists of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), a Programmable ROM (PROM), a flash memory, a hard disk drive, or a combination thereof. The memory 3003 may include a storage that is located physically apart from the processor 3002. In this case, the processor 3002 may access the memory 3003 through an I/O interface (not shown).

The memory 3003 may be used to store one or more software modules including instructions and data for executing the process of the UE 3 regarding the process 300, 400,

800, 900, 1000, or 1100 described in the above embodiments. The processor 3002 loads the one or more software modules from the memory 3003 and executes the loaded software module(s), thereby performing the process of the UE 3 described in the above embodiments.

Figure 15:
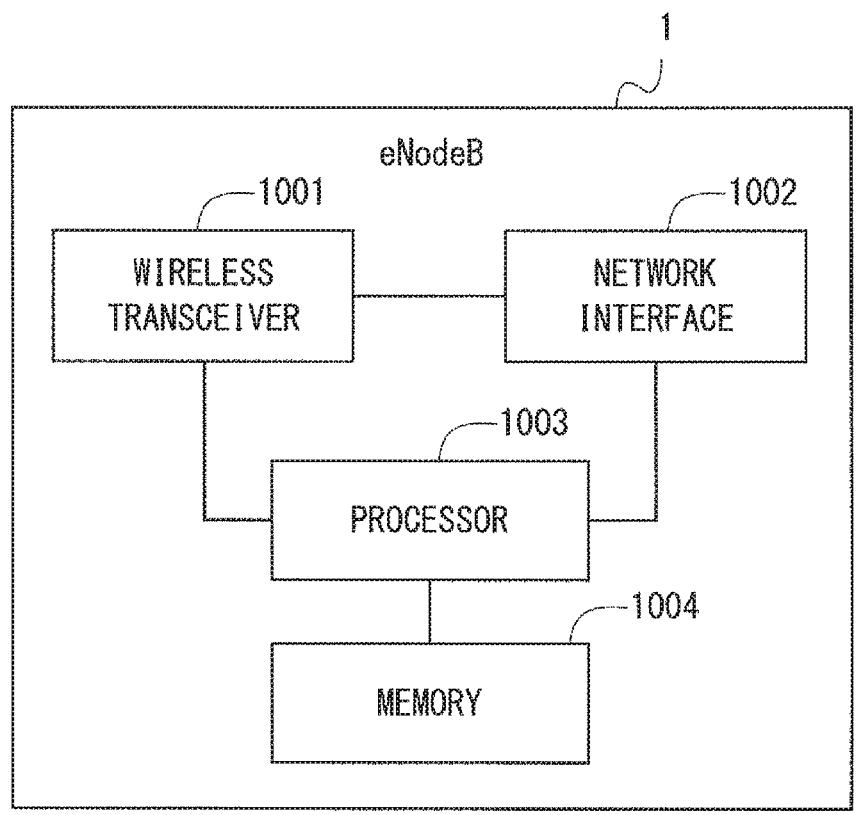
FIG. 15 is a block diagram showing a configuration example of a radio base station according to some embodiments.
Figure 16:
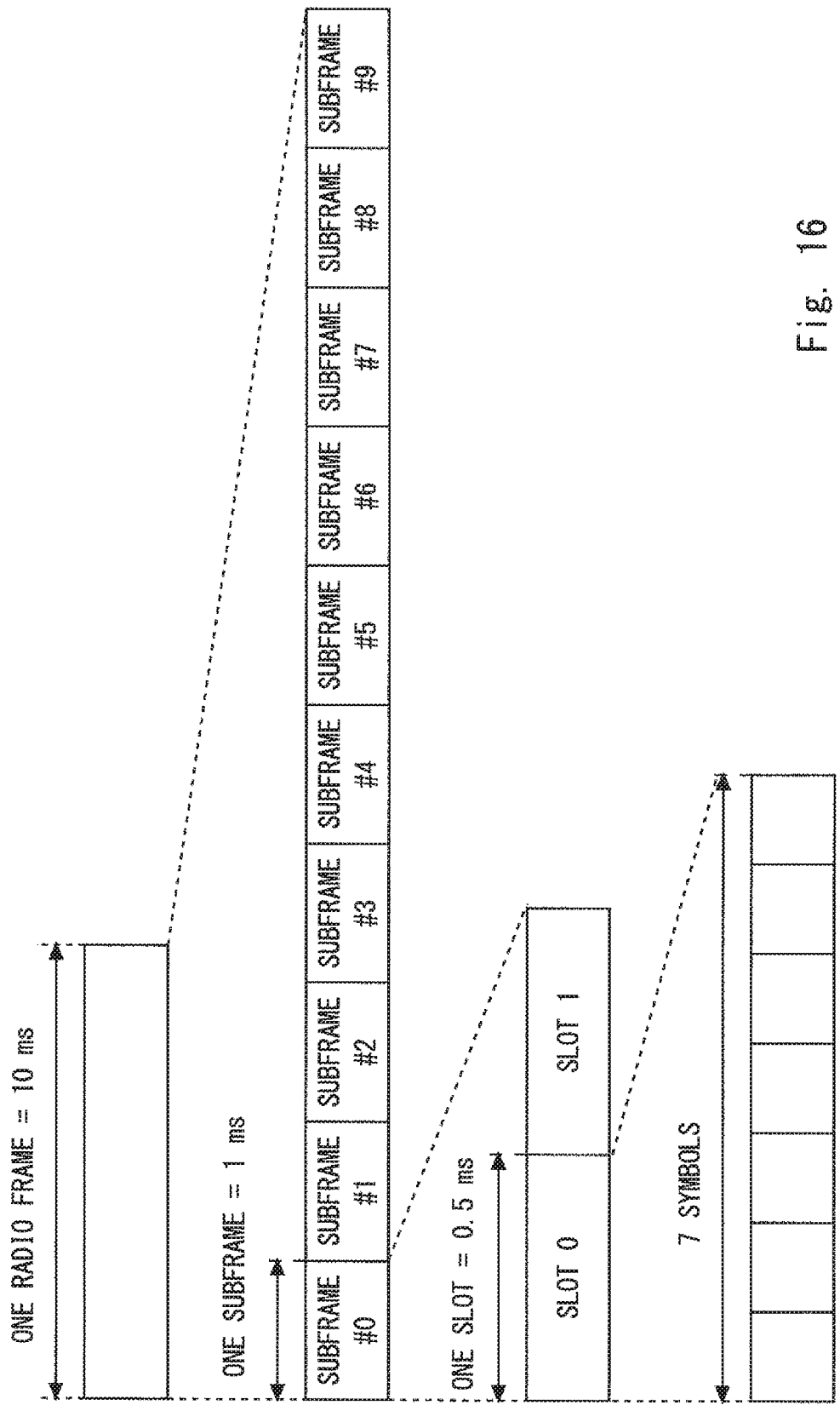
FIG. 16 is diagram showing a radio frame structure and a subframe structure in LTE.
Figure 17:
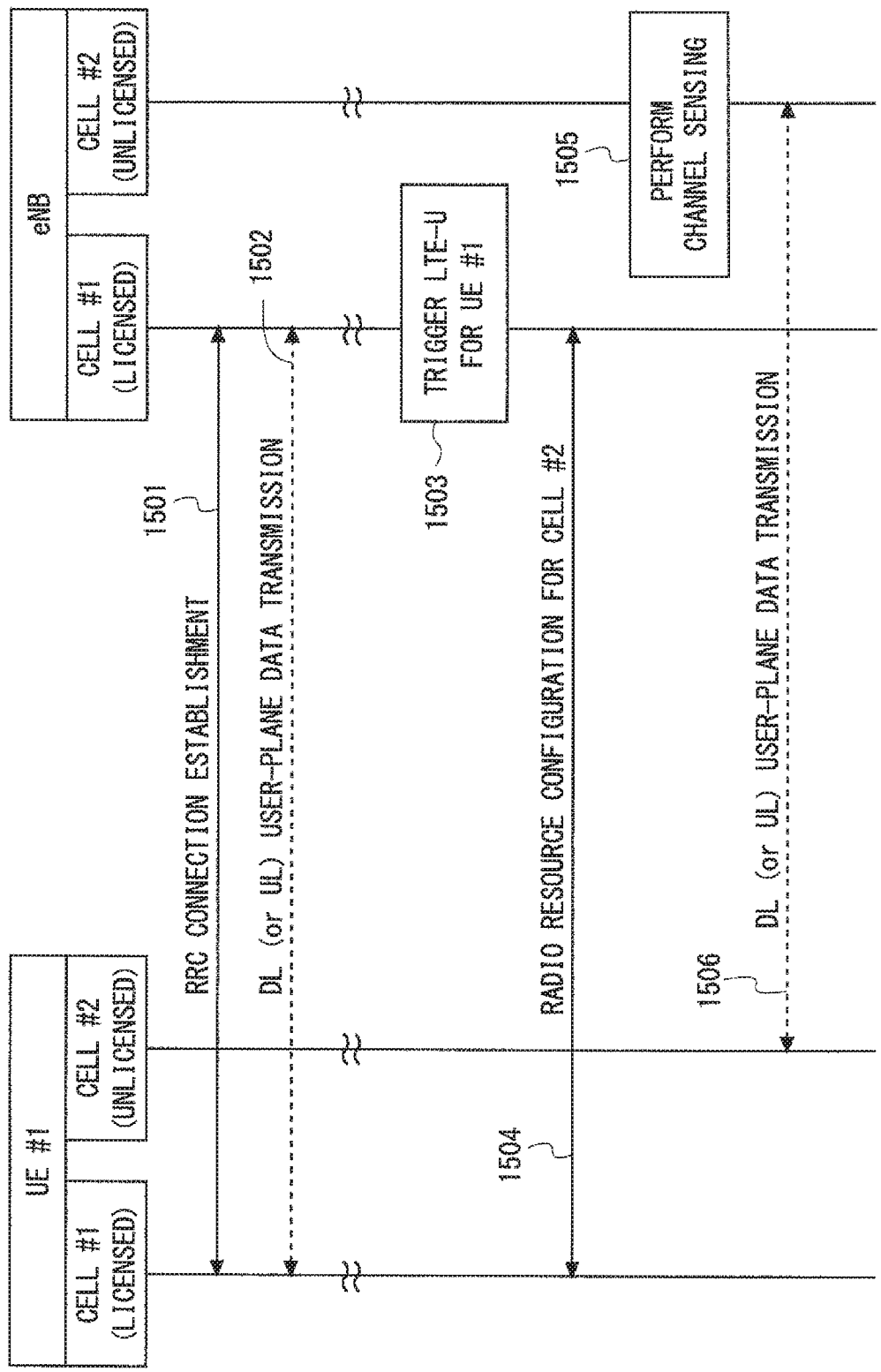
FIG. 17 is a sequence diagram showing an operation of a radio base station and a radio terminal in LTE-U.
Figure 18:
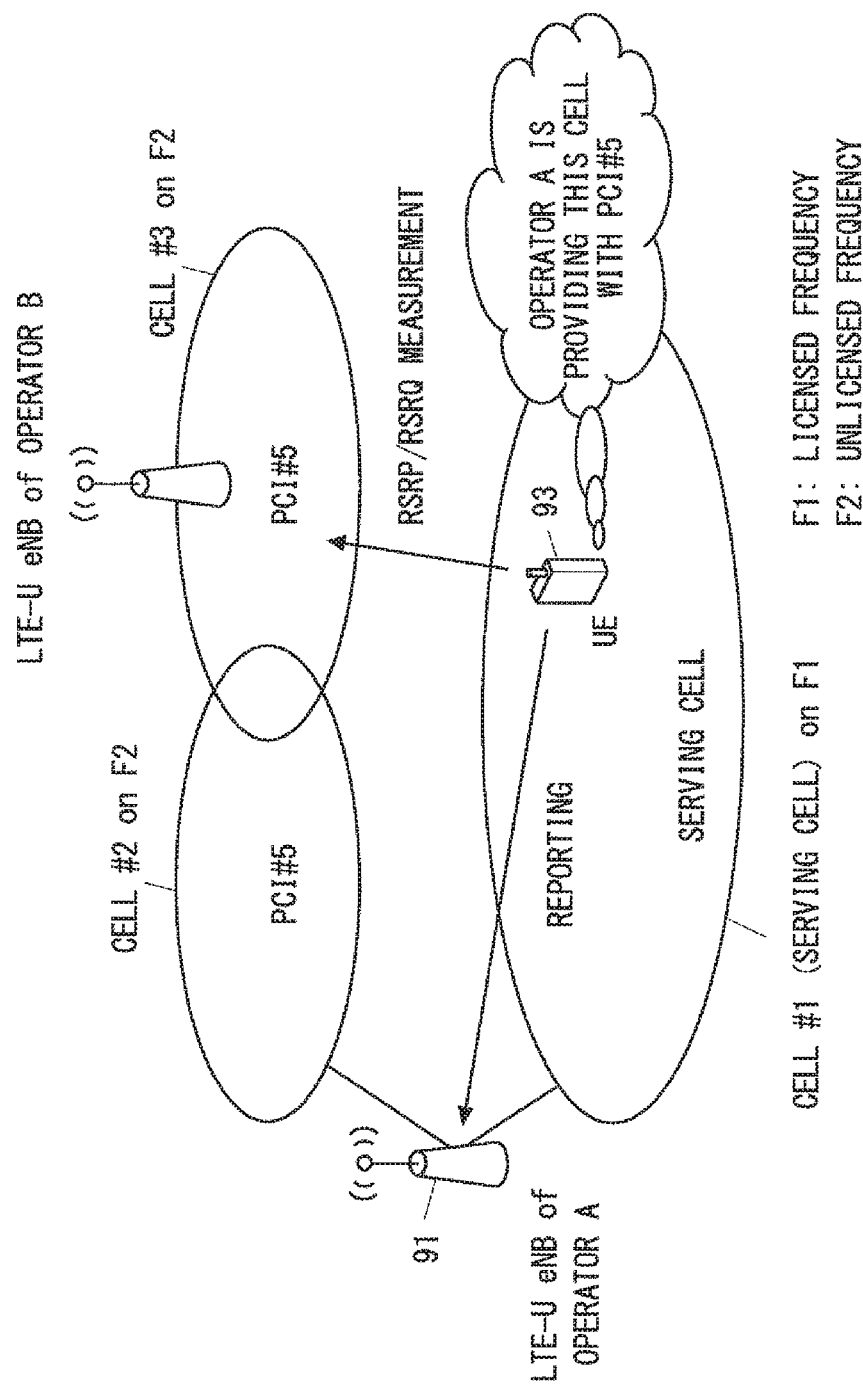
FIG. 18 is a diagram for describing an example of an operation of a UE when a plurality of cells uses the same PCI.

FIG. 15 is a block diagram showing a configuration example of the radio base station (LTE-U eNB) 1 according to the first to fourth embodiments. The radio base stations 4 and 5 according to the fifth embodiment may have the same configuration as that shown in FIG. 15. Referring to FIG. 15, the LTE-U eNB 1 includes a wireless transceiver 1001, a network interface 1002, a processor 1003, and a memory 1004. The wireless transceiver 1001 is configured to communicate with the UE 3. The network interface 1002 is used to communicate with network nodes (e.g., MME and S-GW). The network interface 1002 may include, for example, a network interface card (NIC) conforming to the IEEE 802.3 series.

The processor 1003 loads software (computer program) from the memory 1004 and executes the loaded software, thereby performing the process of the LTE-U eNB 1 regarding the process 300, 400, 700, 800, or 900 described in the above embodiments. The processor 1003 may be a microprocessor, an MPU, or a CPU. The processor 1003 may include a plurality of processors.

The memory 1004 consists of a combination of a volatile memory and a non-volatile memory. The volatile memory is, for example, an SRAM, a DRAM, or a combination thereof. The non-volatile memory is, for example, an MROM, a PROM, a flash memory, a hard disk drive, or a combination thereof. The memory 1004 may include a storage that is located physically apart from the processor 1003. In this case, the processor 1003 may access the memory 1004 through the network interface 1002 or an I/O interface (not shown).

The memory 1004 may be used to store one or more software modules including instructions and data for executing the process of the LTE-U eNB 1 regarding the process 300, 400, 800, 900, 1000, or 1100 described in the above embodiments. The processor 1003 loads the one or more software modules from the memory 1004 and executes the loaded software module(s), thereby performing the process of the LTE-U eNB 1 described in the above embodiments.

As described with reference to FIGS. 13 and 14, each of the processors included in the UEs 3 and 7 and the eNBs 1, 4, and 5 according to the above-described embodiments executes one or more programs including a set of instructions that causes a computer to perform algorithms explained with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). These programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Other Embodiments

Each of the above-described embodiments may be used individually, or two or more of the embodiments may be appropriately combined with one another.

In the above embodiments, although it has been described using the drawings showing only the cells that use the same PCI, as a cell on an unlicensed frequency for convenience of description (FIGS. 2, 12, etc.), these drawings are merely examples. Specifically, in the above embodiments, at least one cell in which no PCI conflict is occurring may be operated on the unlicensed frequency, and the UEs 3 and 7 may perform the above-described process 300, 400, 700, 800, 900, or the like on the at least one cell. Moreover, in the above embodiments, a plurality of frequencies (carriers or channels) may be available on an unlicensed frequency, and the UEs 3 and 7 may perform the process 300, 400, 700, 800, 900, or the like on all of the plurality of frequencies or on a frequency indicated by the LTE-U eNB.

For example, in addition to the Cell #2 (PCI #5) and Cell #3 (PCI #5) shown in FIG. 2, if there is a Cell #4 (PCI #6) having a PCI different from the PCI #5, the UE 3 may detect: (i) the PCI #5 corresponding to the Cell #2 and the frame timing of the Cell #2; (ii) the PCI #5 corresponding to the Cell #3 and the frame timing of the Cell #3; and (iii) the PCI #6 corresponding to the Cell #4 and the frame timing of the Cell #4, and then report these to the LTE-U eNB 1. Alternatively, the UE 3 may not report (i) the PCI #5 corresponding to the Cell #2 and the frame timing of the Cell #2 and (ii) the PCI #5 corresponding to the Cell #3 and the frame timing of the Cell #3 and may instead report (iii) the PCI #6 corresponding to the Cell #4 and the frame timing of the Cell #4 to the LTE-U eNB 1. In these examples, the LTE-U eNB 1 may receive the report from the UE 3 and select, as a secondary cell (SCell) for CA, the Cell #4, which is estimated to have no PCI conflict occurring therein, in preference over the Cell #2, in which a PCI conflict is possibly occurring therein.

The PCI described in the above embodiments is an example of the cell identifier (physical identifier). For example, in cells on the unlicensed frequency, a conflict in cell identifiers other than the PCI may occur. In some implementations, the cell identifier on the unlicensed frequency may be a Virtual Cell ID. The Virtual Cell ID may be, for example, a scrambling code (e.g., Scrambling Identity or Scrambling Code ID) used to transmit a reference signal in the cell on the unlicensed frequency. Instead, in some implementations, the cell identifier on the unlicensed frequency may be an identifier other than the PCI, which is defined by providing a new cell number or cell index to the cell on the unlicensed frequency. These identifiers may be used in place of or in combination with the PCI.

The explanations of the above embodiments have been provided with regard to the case of LAA. That is, in the first to fourth embodiments, Carrier Aggregation (CA) in which the radio base station (LTE-U eNB) 1 and radio terminal (UE) 3 use the cell on the unlicensed frequency as the Secondary Cell (SCell) while using the cell on the licensed frequency as the Primary Cell (PCell) has been mainly described. In the fifth embodiment, Dual Connectivity (DC) in which the MeNB 4 and SeNB 5 use the licensed frequency and the SeNB 5 further uses the unlicensed frequency has been mainly described. However, in the first to fourth embodiments, the radio base station (LTE-U eNB) 1 may perform Carrier Aggregation (CA) using a shared frequency (e.g., F3) as the PCell and using an unlicensed frequency in a narrow sense (e.g., F2) or another shared frequency (e.g., F4) as the secondary cell (SCell). The unlicensed frequency in a narrow sense means a frequency that is not allocated to any operator (i.e., a frequency that is neither the licensed frequency nor the shared frequency). Likewise, in the fifth embodiment, the MeNB 4 may use a shared frequency and the SeNB 5 may use a shared frequency or an unlicensed frequency in a narrow sense in Dual Connectivity (DC).

A PCI conflict could occur in various situations other than in the situations where LTE operators use the unlicensed frequency (or licensed shared frequency) for LAA (or LSA). The PCI conflict, i.e., PCI collision or PCI confusion, could occur when any of an unlicensed frequency, a licensed shared frequency, and a licensed frequency is used, and could occur between operators or within one operator. The technique for the UE to differentiate among cells that use the same PCI and the same frequency based on the relationship between the frame timings of these cells and that of the serving cell, which has been described in the above embodiments, can be applied to various cases in which a PCI conflict occurs.

Furthermore, as already described above, a PCI confusion could occur when cells use different frequencies but use the same PCI. The technique for the UE to differentiate among cells that use the same PCI and the same frequency based on the relationship between the frame timings of these cells and that of the serving cell, which has been described in the above embodiments, can be applied to various cases in which a PCI confusion occurs among cells using different frequencies.

The explanations of the aforementioned embodiments have been provided with regard to the LTE system. However, as has been described, these embodiments may be applied to radio communication systems other than the LTE system, for example, to a 3GPP UMTS, a 3GPP2 CDMA2000 system (1×RTT, HRPD), a GSM/GPRS system, a WiMAX system, or the like. The radio base station (eNB) and RRH/RRE having the function for performing communication of LTE on the unlicensed frequency have been referred to as a radio base station (LTE-U eNB). In other systems as well, a network node(s) capable of communicating on a plurality of frequencies (e.g., licensed and unlicensed frequencies) may be introduced and it may be collectively referred to as a radio station. That is, the radio station corresponds to a radio base station (eNB) and an RRH/RRE in LTE, corresponds to a base station (NodeB: NB) and a base station control station (RNC) in UMTS, and corresponds to a base station (BTS) and a base station control station (BSC) in the CDMA200 system. Especially in the example of Dual Connectivity (DC), a base station system including a main base station (MeNB in LTE) and a sub base station (SeNB in LTE) may be referred to as a radio station. Each of the main base station and sub base station may be referred to as a radio communication node.

In the radio communication systems other than LTE, cell identifiers other than the PCI are used (e.g., PSC used in 3GPP UMTS). A conflict could occur in these cell identifiers in a manner similar to the PCI conflict. The technique for the UE to differentiate among cells that use the same PCI based on the relationship between the frame timings of these cells and that of the serving cell, which has been described in the above embodiments, can be applied to various cases in which a conflict in other cell identifiers such as PSC or the like occurs.

In addition, in the above embodiments, the plurality of cells (e.g., Cell #2 and Cell #3 in FIG. 2) configured to use the same cell identifier and the same frequency may use Radio Access Technology (RAT) different from that of the serving cell (e.g., Cell #1 in FIG. 2). For example, the serving cell may be an LTE (E-UTRAN) cell, and the plurality of cells different from the serving cell may be UMTS (UTRAN) cells.

The above-described embodiments are merely examples of applications of the technical ideas obtained by the inventor. These technical ideas are not limited to the above-described embodiments, and various modifications may be made as a matter of course.

This application is based upon and claims the benefit of priority from Japanese Patent Application No. 2014-226392, filed on Nov. 6, 2014, the disclosure of which is incorporated herein in its entirety by reference.

REFERENCE SIGNS LIST

1, 4, 5 RADIO BASE STATION
3, 7 RADIO TERMINAL
1001, 3001 WIRELESS TRANSCEIVER
1002 NETWORK INTERFACE
1003, 3002 PROCESSOR
1004, 3003 MEMORY

The invention claimed is:

1. A radio terminal configured to perform Licensed Assisted Access (LAA) using a primary cell operating in licensed frequency and a secondary cell operating in unlicensed frequency, the radio terminal comprising:
   a memory; and
   at least one processor coupled to the memory and configured to perform a predetermined process regarding the secondary cell on the unlicensed frequency based at least on considering a timing of a first symbol in a subframe of the primary cell being aligned with a timing of a first symbol in a subframe of the secondary cell, wherein
   the predetermined process regarding the secondary cell on the unlicensed frequency is Received Signal Strength Indicator (RSSI) measurements on the unlicensed frequency, and
   the at least one processor is configured to receive, via a transceiver, from a radio station of the primary cell, an offset value to indicate the subframe of the secondary cell.

2. The radio terminal according to claim 1, wherein the predetermined process further includes at least one of cell search, cell selection, cell reselection, detection of proximity to a cell, reporting of proximity to a cell, terminal measurement, reporting of a terminal measurement result, radio quality measurement, reporting of a radio quality measurement result, channel state measurement, reporting of a channel state measurement result, and sensing.

3. The radio terminal according to claim 1, wherein the timing of the first symbol in the subframe of the primary cell is (a) a time when the radio terminal receives a beginning of the first symbol, or (b) a time when one or a plurality of radio stations transmits the beginning of the first symbol.

4. A method performed by a radio terminal comprising:
   performing a predetermined process regarding a secondary cell on an unlicensed frequency based at least on considering a timing of a first symbol in a subframe of a primary cell using a licensed frequency being aligned with a timing of a first symbol in a subframe of the secondary cell using the unlicensed frequency; and performing Licensed Assisted Access (LAA) using the primary cell operating in the licensed frequency and the secondary cell operating in the unlicensed frequency, wherein the predetermined process regarding the secondary cell on the unlicensed frequency is Received Signal Strength Indicator (RSSI) measurements on the unlicensed frequency, and the method further comprises receiving, via a transceiver, from a radio station of the primary cell, an offset value to indicate the subframe of the secondary cell.

* * * * *